United States Patent
Forster et al.

(10) Patent No.: US 10,658,903 B2
(45) Date of Patent: May 19, 2020

(54) CURRENT LIMIT FOR A POWER TOOL POWERED BY DIFFERENT POWER SUPPLIES

(71) Applicant: Black & Decker Inc., New Britain, CT (US)

(72) Inventors: Michael K. Forster, White Hall, MD (US); John C. Vanko, Timonium, MD (US); Bhanuprasad V. Gorti, Perry Hall, MD (US); Tal Gottesman, Lutherville, MD (US)

(73) Assignee: Black & Decker Inc., New Britain, CT (US)

( * ) Notice: Subject to any disclaimer, the term of this patent is extended or adjusted under 35 U.S.C. 154(b) by 0 days.

(21) Appl. No.: 15/672,712

(22) Filed: Aug. 9, 2017

(65) Prior Publication Data
US 2017/0338754 A1    Nov. 23, 2017

Related U.S. Application Data

(63) Continuation of application No. 14/715,079, filed on May 18, 2015, now Pat. No. 9,762,153, which is a
(Continued)

(51) Int. Cl.
*H02P 6/14* (2016.01)
*H02P 6/28* (2016.01)
(Continued)

(52) U.S. Cl.
CPC .......... *H02K 7/145* (2013.01); *B24B 23/028* (2013.01); *B24B 47/12* (2013.01); *B25F 5/008* (2013.01);
(Continued)

(58) Field of Classification Search
CPC ...... H02P 6/15; H02P 6/28; H02P 6/14; H02P 1/423; H02P 9/107; H02P 29/02;
(Continued)

(56) References Cited

U.S. PATENT DOCUMENTS 3,530,350 A    9/1970   Gawron et al.
4,080,940 A    3/1978   Fuzzell et al.
(Continued)

FOREIGN PATENT DOCUMENTS

DE    202013008945    10/2013
EP    0951135    10/1999
(Continued)

OTHER PUBLICATIONS

Notice of Allowance dated Jul. 31, 2015 issued in corresponding U.S. Appl. No. 14/057,003.
(Continued)

*Primary Examiner* — Jorge L Carrasquillo
*Assistant Examiner* — Said Bouziane
(74) *Attorney, Agent, or Firm* — Amir Rohani

(57) ABSTRACT

A power tool is provided including a brushless electric motor, a switching arrangement having motor switches and interposed between the electric motor and a power supply, and a controller configured to control a switching operation of the motor switches for driving the electric motor and enforce a current limit on the current delivered to the electric motor. The controller receives a measure of current passing from the power supply to the switching arrangement and takes corrective action to reduce current delivered to the electric motor if the measured current exceeds the current limit. The controller further receives a signal corresponding to at least one of a type and/or a nominal voltage of the power supply and sets the current limit based on the received signal.

18 Claims, 14 Drawing Sheets

Related U.S. Application Data continuation-in-part of application No. 14/057,003, filed on Oct. 18, 2013, now Pat. No. 9,314,900.

(60) Provisional application No. 62/000,307, filed on May 19, 2014, provisional application No. 61/994,953, filed on May 18, 2014.

(51) Int. Cl.
| | | |
|---|---|---|
| *H02P 6/15* | (2016.01) | |
| *B24B 47/12* | (2006.01) | |
| *H02P 6/04* | (2016.01) | |
| *H02K 7/14* | (2006.01) | |
| *B25F 5/00* | (2006.01) | |
| *B24B 23/02* | (2006.01) | |

(52) U.S. Cl.
CPC ............... *H02P 6/14* (2013.01); *H02P 6/15* (2016.02); *H02P 6/28* (2016.02); *H02P 2006/045* (2013.01)

(58) Field of Classification Search
CPC ..... H02P 29/032; B24B 23/028; B24B 47/12; B25F 5/008; H02H 7/08; H02H 3/025; H02H 9/00
See application file for complete search history.

(56) References Cited

U.S. PATENT DOCUMENTS

| | | | |
|---|---|---|---|
| 4,528,485 A | 7/1985 | Boyd et al. | |
| 4,832,133 A | 5/1989 | Boys et al. | |
| 5,304,882 A | 4/1994 | Lipo et al. | |
| 5,420,495 A | 5/1995 | Hingorani | |
| 5,798,596 A | 8/1998 | Lordo et al. | |
| 5,994,869 A | 11/1999 | Becerra et al. | |
| 6,133,664 A | 10/2000 | Torok et al. | |
| 6,316,895 B1 | 11/2001 | Ramarathnam | |
| 6,320,286 B1 | 11/2001 | Ramarathnam | |
| 6,326,762 B1 | 12/2001 | Jiang et al. | |
| 6,651,860 B2 | 11/2003 | Artmann et al. | |
| 6,664,756 B2 | 12/2003 | Horng et al. | |
| 6,758,288 B2 | 7/2004 | Richter et al. | |
| 6,940,238 B2 | 9/2005 | Gerfast et al. | |
| 6,943,510 B2 | 9/2005 | Gorti | |
| 7,088,066 B2 | 8/2006 | Haller | |
| 7,112,936 B2 | 9/2006 | Lee et al. | |
| 7,318,768 B2 | 1/2008 | Deshpande et al. | |
| 7,699,687 B2 | 4/2010 | Nordstrom et al. | |
| 7,715,698 B2 | 5/2010 | Bonner et al. | |
| 8,212,507 B2 | 7/2012 | Wystup et al. | |
| 8,217,602 B2 | 7/2012 | Ikei et al. | |
| 8,338,997 B2 | 12/2012 | Nishikawa | |
| 8,400,089 B2 | 3/2013 | Bonner et al. | |
| 8,446,120 B2 | 5/2013 | Forster et al. | |
| 8,636,079 B2 | 1/2014 | Totsu | |
| 8,640,789 B2 | 2/2014 | Harada et al. | |
| 8,816,544 B2 | 8/2014 | Tanimoto et al. | |
| 8,847,532 B2 | 9/2014 | Miyazaki et al. | |
| 8,917,042 B2 | 12/2014 | Becerra et al. | |
| 8,928,261 B2 | 1/2015 | Haga et al. | |
| 8,937,446 B2 | 1/2015 | Clothier et al. | |
| 8,941,347 B2 | 1/2015 | Otorii et al. | |
| 9,364,906 B2 | 6/2016 | Abe et al. | |
| 2003/0042859 A1 | 3/2003 | Gorti et al. | |
| 2003/0132725 A1 | 7/2003 | Cheung | |
| 2006/0221528 A1 | 10/2006 | Li et al. | |
| 2009/0207035 A1 | 8/2009 | Watanabe et al. | |
| 2010/0009608 A1 | 1/2010 | Lo et al. | |
| 2011/0056715 A1 | 3/2011 | Vanko et al. | |
| 2011/0171887 A1 | 7/2011 | Tanimoto et al. | |
| 2011/0254486 A1 | 10/2011 | Celik et al. | |
| 2011/0284255 A1 | 11/2011 | Ookubo et al. | |
| 2012/0014065 A1 | 1/2012 | Haga et al. | |
| 2012/0191252 A1* | 7/2012 | Rockenfeller | ........ F25B 27/005 700/276 |
| 2012/0206078 A1 | 8/2012 | Norell et al. | |
| 2012/0235661 A1 | 9/2012 | Roessler et al. | |
| 2012/0292068 A1 | 11/2012 | Velderman et al. | |
| 2012/0293096 A1 | 11/2012 | Mizoguchi et al. | |
| 2013/0000934 A1 | 1/2013 | Tadokoro et al. | |
| 2013/0185947 A1 | 7/2013 | Barkley et al. | |
| 2013/0186661 A1 | 7/2013 | Okubo et al. | |
| 2013/0207590 A1 | 8/2013 | Yanagihara et al. | |
| 2014/0001993 A1 | 1/2014 | Iwata et al. | |
| 2014/0042878 A1 | 2/2014 | Silitonga et al. | |
| 2015/0015094 A1 | 1/2015 | Haga et al. | |
| 2015/0017891 A1 | 1/2015 | Nordstrom | |
| 2015/0020391 A1 | 1/2015 | Abe et al. | |
| 2015/0026985 A1 | 1/2015 | Yamaguchi | |
| 2015/0042246 A1 | 2/2015 | Tadokoro et al. | |
| 2015/0047866 A1 | 2/2015 | Sakai et al. | |
| 2015/0288250 A1 | 10/2015 | Vanko et al. | |
| 2016/0111984 A1* | 4/2016 | Koizumi | ................ B25F 5/00 318/400.22 |

FOREIGN PATENT DOCUMENTS

| | | |
|---|---|---|
| EP | 1275196 | 1/2003 |
| EP | 1864762 | 12/2007 |
| EP | 1873800 | 1/2008 |
| EP | 2478998 | 7/2012 |
| EP | 2626175 | 8/2013 |
| JP | 07337072 A * | 12/1995 |
| JP | 2008018006 | 1/2008 |
| JP | 2010154714 | 7/2010 |
| JP | 2010154715 | 7/2010 |
| KR | 101257890 | 4/2013 |
| WO | 2012127851 | 9/2012 |
| WO | 2013033704 | 3/2013 |

OTHER PUBLICATIONS

Non Final Office Action dated Feb. 1, 2017 issued in corresponding U.S. Appl. No. 14/715,079.

Notice of Allowance dated May 9, 2017 issued in corresponding U.S. Appl. No. 14/715,079.

\* cited by examiner

CURRENT LIMIT FOR A POWER TOOL POWERED BY DIFFERENT POWER SUPPLIES

CROSS-REFERENCE TO RELATED APPLICATIONS

This application is a continuation application of U.S. application Ser. No. 14/715,079 filed May 18, 2015, which is a continuation-in-part of U.S. patent application Ser. No. 14/057,003 filed on Oct. 18, 2013, and also claims the benefit of U.S. Provisional Application No. 61/994,953, filed on May 18, 2014 and U.S. Provisional Application No. 62/000,307, filed on May 19, 2014. The entire disclosure of each of the above applications are incorporated herein by reference.

FIELD

The present disclosure relates to a powered apparatus and more generally to a power tool having a brushless electric motor.

BACKGROUND

Handheld angle grinders are commonly used for cutting, grinding, sanding, and polishing workpieces. Due to the large diameter of the grinding disk and/or the large bias applied by the tool operator during certain tasks, the current demand by the tool from an AC power outlet can exceed the rating of the circuit breaker associated with the power outlet, thereby causing the breaker to trip. Consequently, there is a need to increase the power output of such grinders and other handheld power tools within the limits of the AC power source and without resorting to complicated and expensive power conversion circuits. Various techniques are set forth below for increasing power output by handheld power tools, especially ones employing a brushless electric motor.

This section provides background information related to the present disclosure which is not necessarily prior art.

SUMMARY

This section provides a general summary of the disclosure, and is not a comprehensive disclosure of its full scope or all of its features.

A handheld AC power tool is provided. The power tool is comprised generally of: a brushless electric motor; a power cord connectable to an AC power socket; a converter circuit configured to receive input power from the power cord and operable to output a DC bus voltage, a switching arrangement having a plurality of motor switches and interposed between the electric motor and the converter circuit; a motor drive circuit interfaced with the motor switches to control switching operation of the motor switches; and a power switch electrically connected between the converter circuit and the motor drive circuit and operable by a user to selectively energize the motor drive circuit and thereby power on the tool. The converter circuit includes a rectifier and a capacitor electrically coupled across the rectifier, such that the capacitor has capacitance sized to produce a DC bus voltage whose magnitude from an AC power source is substantially same as magnitude of voltage from a DC power source, where voltage rating of the AC power source is same as voltage rating of the DC power source.

In one embodiment, the capacitor has a nominal capacitance in the range of 200-400 micro Farads for tool having a current rating of approximately 10 Amps.

In another embodiment, the capacitor has a nominal capacitance on the order of 350 micro Farads for tool having a current rating of approximately 15 Amps.

In yet another embodiment, the capacitor has a nominal capacitance on the order of 500 micro Farads for tool having a current rating of approximately 20 Amps.

The power tool may further include a controller configured to receive a measure of instantaneous current passing from the rectifier to the switching arrangement and operate over periodic time intervals to enforce a limit on current delivered to the electric motor. The controller enforces the current limit by comparing instantaneous current measures to the current limit and, in response to an instantaneous current measure exceeding the current limit, turning off the motor switches for remainder of a present time interval and thereby interrupt current flowing to the electric motor. The controller further operates to turn on select motor switches at end of the present time interval and thereby resumes current flow to the electric motor.

In another aspect of this disclosure, a handheld grinder is provided. The grinder is comprised of: an elongated housing having a grip portion that is shaped to be grasped by a user; a brushless electric motor drivably connected to an output shaft to impart rotary motion thereto; a grinding disk connected to one end of the output shaft; a rectifier configured to receive power from an alternating current (AC) power source and operable to convert an alternating current to a direct current; a switching arrangement having a plurality of motor switches and interposed between the electric motor and the rectifier; a capacitor electrically coupled across the rectifier and interposed between the rectifier and the switching arrangement; a motor drive circuit interfaced with the motor switches and operates at a given frequency to control switching operation of the motor switches; and a controller configured to receive a measure of instantaneous current passing from the rectifier to the switching arrangement and operates over periodic time intervals to enforce a current limit on the current delivered to the electric motor.

In some embodiments, the controller enforces the current limit by comparing instantaneous current measures to the current limit and, in response to an instantaneous current measure exceeding the current limit, turning off the motor switches for remainder of present time interval and thereby interrupt current flowing to the electric motor, where duration of each time interval is fixed as a function of the given frequency at which the electric motor is controlled by the controller. Additionally, the controller turns on select motor switches at the end of the present time interval and thereby resumes current flow to the electric motor. The duration of each time interval is approximately ten times an inverse of the given frequency at which the electric motor is controlled by the controller. More specifically, the duration of each time interval is on the order to 100 microseconds.

In one embodiment, the electric motor is controlled by pulse width modulated (PWM) signals received from the motor drive circuit and duration of the each time interval equals period of the PWM signals.

In some embodiments, the brushless electric motor is further defined as a three-phase DC motor and the switching arrangement is comprised of six motor switches, each phase of the DC motor is coupled to a high-side switch and a low-side switch. In this case, the controller controls motors motor operation using the three high-side switches and enforces the current limit using the three low-side switches.

The capacitor has a capacitance in range of 0-200 micro Farads and preferably in the range of 5-20 micro Farads. In an example embodiment, the capacitor is implemented by two capacitors arranged in parallel and collectively having a capacitance on the order of 9.4 micro Farads.

In another aspect of this disclosure, a method is provided for detecting stall condition of an output shaft driven by an electric motor of a power tool. The method includes: measuring current delivered to the electric motor of the power tool at least once during consecutive time intervals; determining whether a measured current exceeds a current limit; incrementing an event counter by one in response to a determination that the measure current exceeds the current limit; resetting the event counter to zero in response to a determination that the measured current does not exceed the current limit; determining whether value of the event counter exceeds an event threshold; and initiating a protective operation in response to a determination that the event counter exceeds an event threshold.

In response to a determination that the measure current exceeds the current limit, current flow to the electric motor is interrupted for the remainder of a given time interval and resuming current flow to the electric motor at an end of the given time interval.

The method can also include: detecting beginning of a new time interval; incrementing an interval counter by one in response to detecting the beginning of a new time interval; determining whether value of the interval counter exceeds an interval threshold; and determining whether value of the event counter exceeds an event threshold in response to a determination that the value of the interval counter exceeds the interval threshold.

In some embodiments, the method can include: monitoring rotational speed of the electric motor; determining whether the rotational speed is less than a speed threshold; and initiating the protective operation in response to a determination that the event counter exceeds an event threshold and a determination that the rotational speed is less than the speed threshold.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
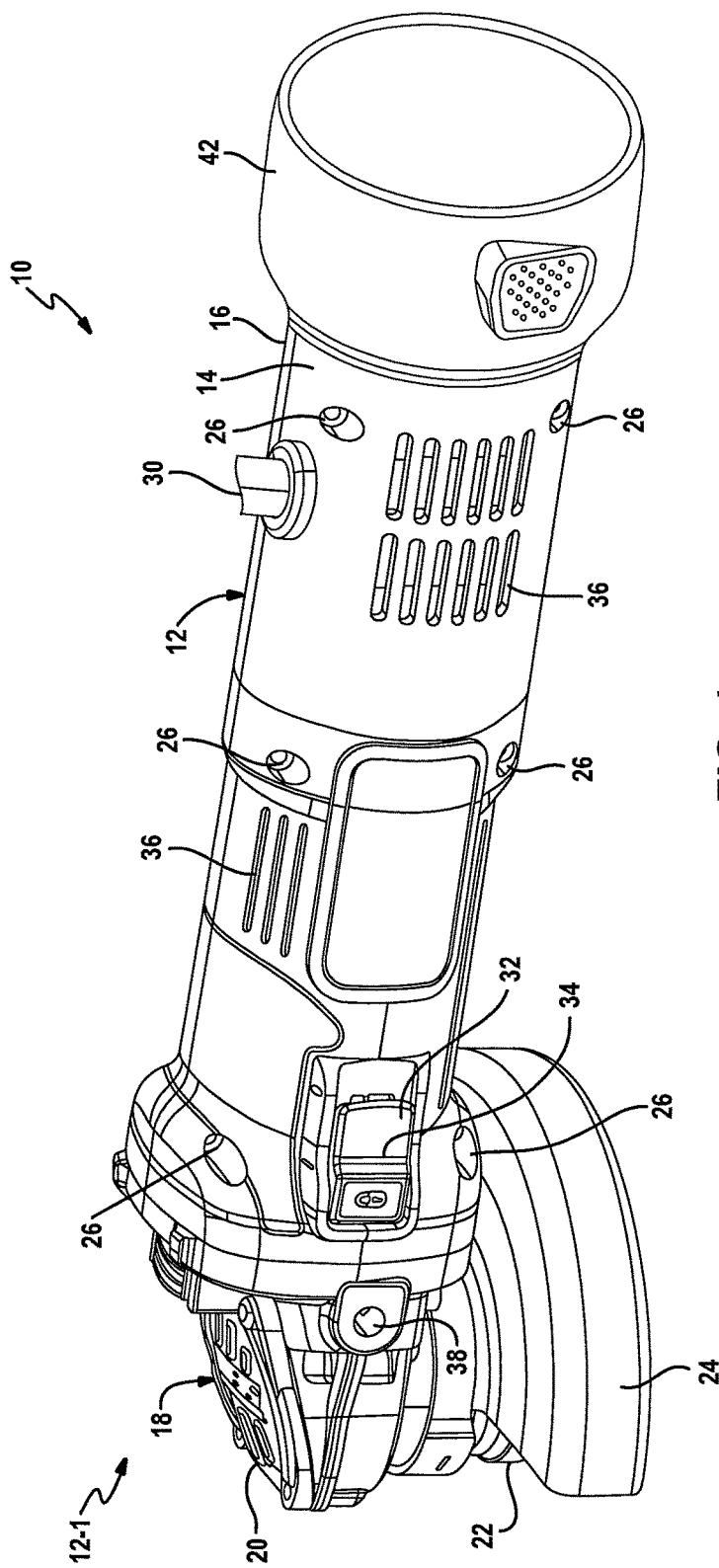
FIG. 1 is a perspective view of a handheld grinder.

FIG. 1 depicts an example of a handheld grinder 10. In this example embodiment, the grinder 10 is comprised of a housing 12 having an elongated shape. A user can grasp the grinder 10 by placing the palm of the user's hand over and around the housing 12. An output member 18 is positioned at one end 12-1 of the housing 12 and comprises a right angle gear set 20 that drives a rotating disk 22. In this example embodiment, the rotating disk 22 comprises a grinder disk. The rotating disk 22 may be removed and replaced with a new rotating disk. For example, a user of the grinder 10 may replace the existing rotating disk 22 with a new rotating disk after the existing rotating disk 22 wears out. An adjustable guard 24 may cover at least a portion of the rotating disk 22 to obstruct sparks and debris generated during operation of the power tool 10.

While the present description is provided with reference to a grinder, it is readily understood that the broader aspects of the present disclosure are applicable to other types of power tools, including but not limited to sander, drill, impact driver, tapper, fastener driver, and saw. For example, the power tool 10 may include a chuck that is configured to receive a drill bit or a screw driver bit, thereby allowing the power tool 10 to be used as a power drill or a power screw driver. In another example embodiment, the output member 18 may be removed and replaced with another output member that may be more suitable for a drill, a screw driver, or any other power tool, thus creating a multipurpose power tool by virtue of a plurality of output members 18.

The housing 12 has a first portion 14 and a second portion 16. The first portion 14 and second portion 16 may be secured together with screws 26, illustratively six, and enclose an electric motor 28 and electronic circuit components, as further described below, that drive the output member 18. The first portion 14 further includes a power on/off switch 32 and a spindle lock switch 34. Putting the power on/off switch 32 in on and off positions turns on and off the electric motor 28, respectively. Pressing and holding the spindle lock switch 34 enables the user to change the rotating disk 22. A plurality of narrow slot openings 36 of the first 14 and second 16 portions allow for venting of the electric motor 28 and the electronic circuit components. The one end 12-1 of the housing 12 also includes a threaded opening 38 for selectively attaching a side-handle (not shown) to enable two-handed operation.

A power cord 30 is connectable to an AC power socket and is positioned at an opposite end 12-2 of the housing 12. The power cord 30 provides power to the electric motor 28 and the electronic circuit components of the power tool 10. Additionally, the power tool 10 is configured to receive a detachable battery pack 42. Specifically, the housing 12 includes a battery mounting portion to which one or more battery packs 42 releasably couple thereto. The battery pack 42 provides DC power to the electric motor 28 and the other electronic components of the power tool. Different attachment mechanisms for battery packs are readily known in the art and may be employed in this application.

In some embodiments, it is envisioned that the tool may be configured to work with battery packs having different nominal voltage ratings. For example, the tool may be configured to work with a single state low voltage pack (e.g., 20V) or a convertible low/medium voltage pack (e.g., 20V/40V or 20V/60V). In other examples, the tool may be configured to work with two convertible medium voltage packs to yield a high output voltage (e.g., 120V or 230V). It is understood that number and arrangement of battery cells in a pack as well as the cell chemistry may vary. Further information regarding power tool systems and convertible battery packs may be found in U.S. Provisional Patent Application Nos. 61/994,953 filed on May 18, 2014 and 62/000,112 filed on May 19, 2014 which are incorporated herein in their entirety.

Figure 2A:
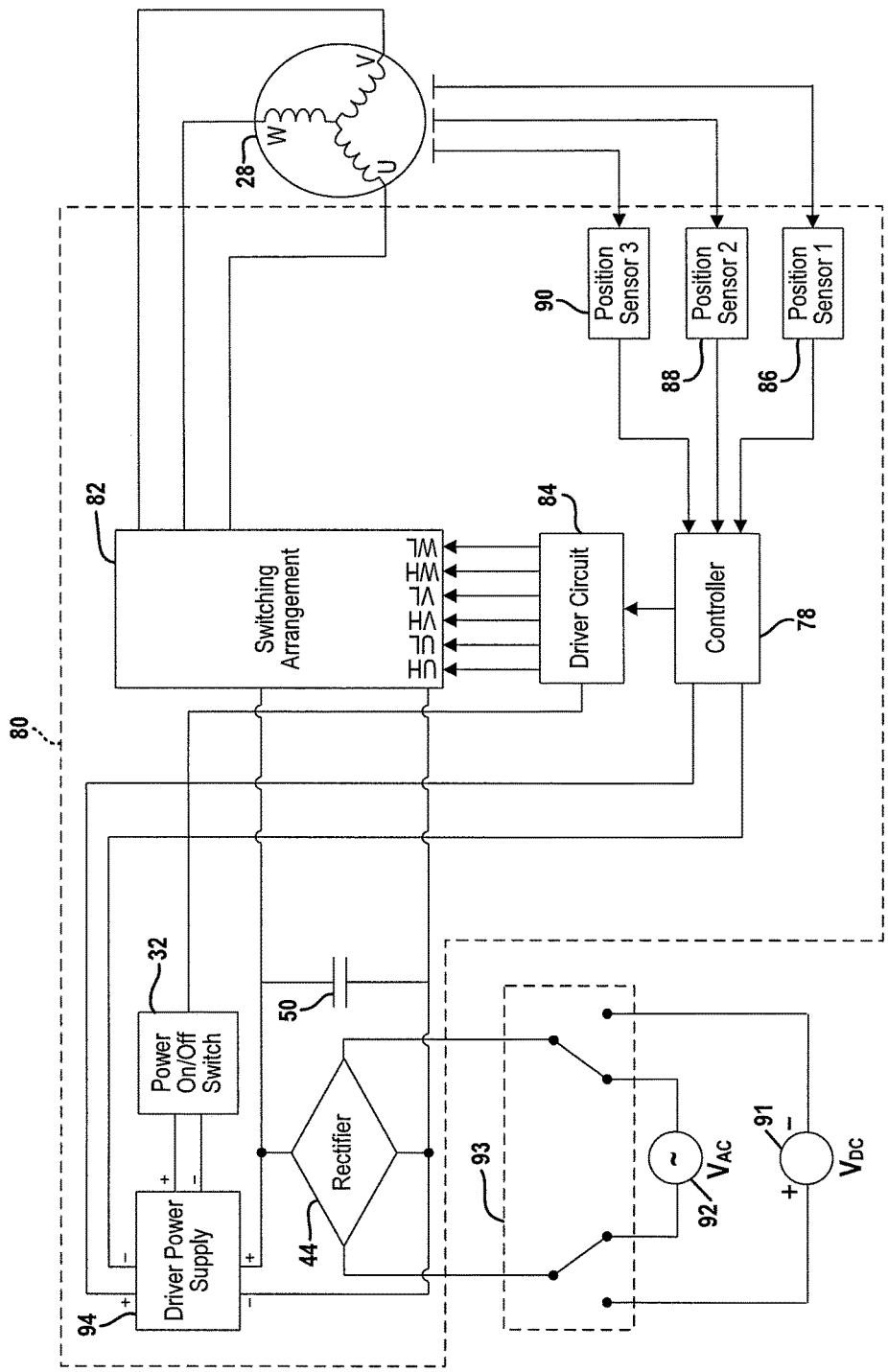
FIG. 2A is a block diagram of an example embodiment of a motor control scheme for use in the grinder.

FIG. 2A depicts a schematic that illustrates an embodiment of a motor control system 80 that may be employed by the power tool 10. The motor control system 80 is comprised generally of the controller 78, a switching arrangement 82 and a driver circuit 84. The motor control system 80 operates to drive an electric motor 28 which may be further defined as a brushless electric motor. The brushless motor may be a three-phase permanent magnet synchronous motor including a rotor having permanent magnets and a wound stator that is commutated electronically as described below. The stator windings are designated herein as U, V, and W windings corresponding to the three phases of the motor 28. It must be understood, however, that other types of brushless motors, such as switched reluctance motors and induction motors, are within the scope of this disclosure. It must also be understood that the brushless motor 28 may include fewer than or more than three phases. While many of the concepts presented herein are particularly applicable to brushless motors, some of the concepts can be applied to other types of motors as well.

The motor control system 80 may further include position sensors 86, 88, 90 that are configured to detect rotational motion of the electric motor 28 and generate a signal indicative of the rotational motion. The signal may have a periodic waveform whose magnitude may vary in accordance with the rotational position of the electric motor 28. The controller 78 is configured to receive signals output by the position sensors 86, 88, 90. In other embodiments the position sensors 86, 88, 90 may be interfaced with the driver circuit 84.

In the example embodiment, the power tool 10 is configured to work with either an AC power supply 92 or a DC power supply 91. The AC power supply 92 delivers an alternating current to the rectifier 44, for example via the power cord 30. The rectifier 44 converts the alternating current into a direct current.

Likewise, a DC input signal from the DC power supply 92 passes through the rectifier 44. When powered from the DC power supply 92, the rectifier 44 simply ensures that the DC supply is connected to the switching arrangement 82 and driver circuit 84 with the correct polarity. In one embodiment, the DC power supply is one or more rechargeable battery packs that detachably couple to the housing 12 of the power tool 10. In other embodiments, the power tool 10 may be configured to receive a DC input via the power cord 30 from other types of sources, such as a generator, a portable welder or a DC outlet in certain types of electrical installations.

The AC power supply 92 and the DC power supply 91 must not be providing power to the tool at the same time to prevent damage to one or both of the two power supplies. Accordingly, an electrical and/or mechanical interlock is used to ensure that only one of the power supplies is providing power to the tool. Various forms of interlocks are readily known in the art and may be employed in this context. It is envisioned that the interlock is configured to generate a signal indicative of whether a battery pack is coupled to the tool. In the case the tool can be powered by battery packs having different nominal voltages, the signal generated by the interlock may further specify the type and/or nominal voltage of the battery packs coupled to the tool.

One example embodiment of an interlock is the double-pole-double-throw (DPDT) switch 93 which connects the AC power supply 92 to the rectifier 44 when it is energized. The switch is in the form of a relay, the coil of said relay energized by the closure of a second small switch that closes only when the AC power supply line is connected to the power tool. Thus, connection of the AC power supply line to the power tool closes the small switch which in turn energizes the relay which drives the DPDT switch 93 in such a way as to connect AC power supply 92 to rectifier 44. Conversely, without the AC power supply line the small switch is not closed, the relay is not energized, and the DPDT switch 93 remains in its unenergized position connecting the DC power supply 91 to the rectifier 44.

Another example embodiment of an interlock to cause the DPDT switch 93 to connect the AC power supply 92 to the rectifier 44 is to slide a mechanical shutter, said shutter covering either the opening which allows connection of the AC power supply line, or covering the other opening which allows connection of the DC power supply 91. In some embodiments, it is envisioned that no interlock is required because the AC power supply and DC power supply have respective protection circuitry such that in the event of simultaneous connection, neither power supply is damaged.

One or more DC bus capacitors 50 are electrically connected in parallel with the rectifier 44. In one aspect of this disclosure, the DC bus capacitors 50 are sized to ensure that the tool delivers comparable output power from either the AC power supply or the DC power supply 91 without exceeding breaker limits as will be further described below.

Figure 3:
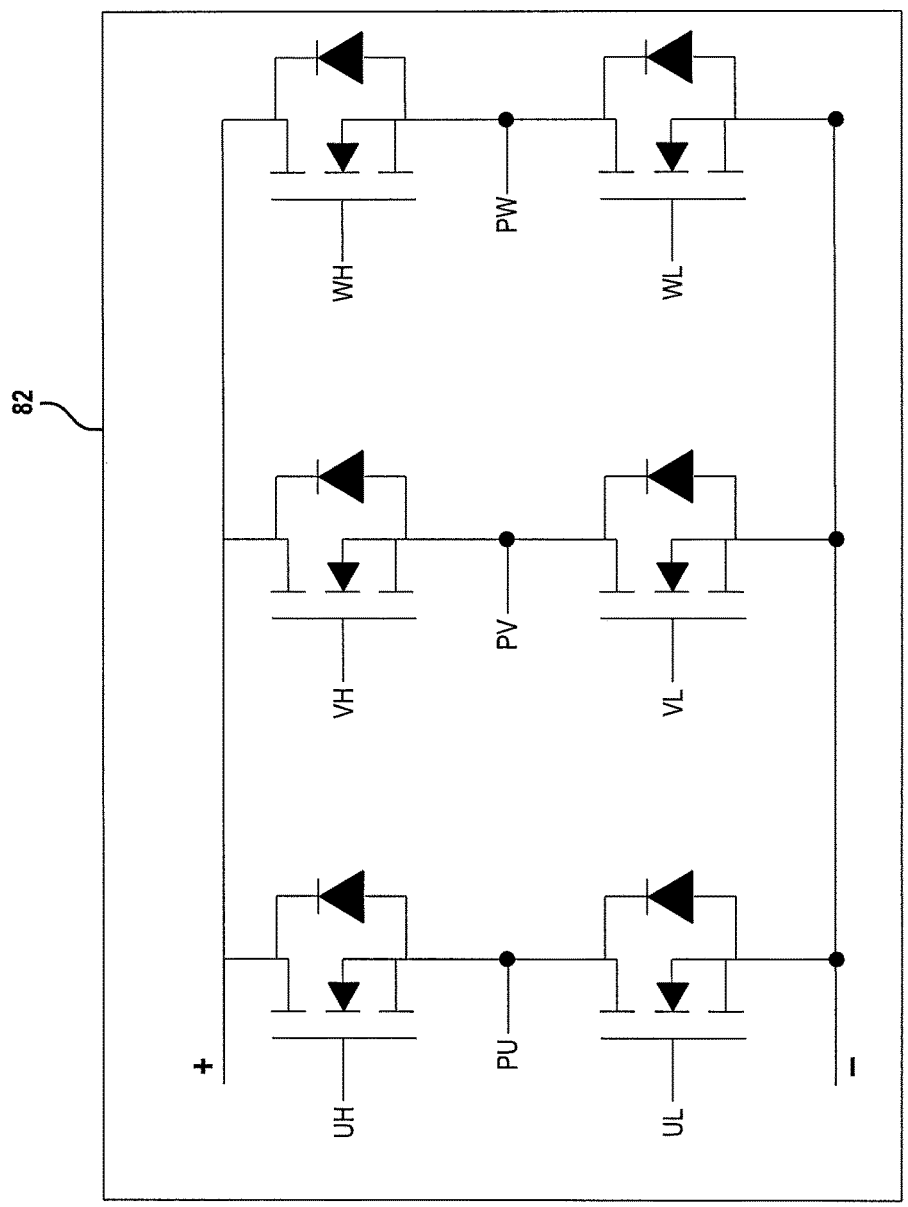
FIG. 3 is a partial schematic depicting an example switching arrangement for use in the grinder.

In the example embodiment, the switching arrangement 82 is electrically connected with the DC bus capacitors 50 and may receive a pure DC signal or substantially pure DC signal from the DC bus capacitors 50. The switching arrangement 82 includes a plurality of motor switches that, when switched on, deliver the DC current to the electric motor 28. Example motor switches include field effect transistors (FETs), insulated-gate bipolar transistors (IGBTs), etc. In the example embodiment, the switching arrangement 82 may be further defined as a three-phase inverter bridge as shown in FIG. 3. As shown, the three-phase bridge circuit includes three high-side and three low-side FETs. The gates of the high-side FETs driven via signals UH, VH, and WH, and the gates of the low-side FETs are driven via motor control signals UL, VL, and WL. In an embodiment, the sources of the high-side FETs are coupled to the drains of the low-side FETs to output power signals PU, PV, and PW for driving the electric motor 28. Other switching arrangements are also contemplated by this disclosure.

The driver circuit 84 is interfaced with the motor switches of switching arrangement 82. The driver circuit 84 controls the state of the motor switches, for example using pulse width modulated (PWM) control signals. In this embodiment, the driver circuit 84 is shown as being separate from the switching arrangement 82. In other embodiments, the driver circuit 84 and the switching arrangement 82 may be a single integrated circuit which may be commercially available from various manufactures. For example, the switching arrangement 82 and the driver circuit 84 may be a part of an integrated power module.

The controller 78 manages the overall operation of the tool. For example, the controller controls switching operation of the motor switches in the switching arrangement. In one embodiment, the controller is implemented by a microcontroller. Controller may also refer to an electronic circuit, an application specific integrated circuit (ASIC), a processor (shared, dedicated, or group) and/or memory (shared dedicated, or group) that execute one or more software or firmware programs, a combinational logic circuit, and/or other suitable components that provide the described functionality.

In this embodiment, the controller 78 receives power from a driver power supply 94. The driver power supply 94 is electrically connected in series with the rectifier 44 and operates to power the driver circuit 84 via the power on/off switch 32. In an example embodiment, driver power supply 94 includes a buck converter and/or a linear regulator to reduce the power voltage, for example, to 15V for powering the driver circuit 84 and to 3.2V for powering the controller 78. In an alternate embodiment, the controller 78 may receive power directly from the rectifier 44.

The power on/off switch 32 is positioned between the driver power supply 94 and the driver circuit 84. In an example embodiment, the switch contact of the power on/off switch 32 is positioned between the driver power supply 94 and the driver circuit 84. In other embodiments, the power switch 32 may be implemented by a variable speed actuator.

When the power on/off switch 32 is switched to the on position, the driver circuit 84 receives power from the driver power supply 94. When the driver circuit 84 receives power, the driver circuit 84 is able to control the state of the motor switches and the electric motor 28 is on.

Conversely, when the power on/off switch 32 is switched to the off position, the driver circuit 84 does not receive power from the driver power supply 94. When the driver circuit 84 does not receive power, the driver circuit 84 is not able to control the state of the motor switches and the electric motor 28 is off.

As illustrated, the power on/off switch 32 is electrically connected between the rectifier 44 and the driver circuit 84. The power on/off switch 32 is positioned such that the power, conveyed from either power supply through the switching arrangement 82, does not pass through the power on/off switch 32. Furthermore, the current being drawn by the electric motor 28 does not pass through the power on/off switch 32. The current passing through the power on/off switch 32 is the current being drawn by the driver circuit 84 and the current being drawn by the driver circuit 84 is lower than the current being drawn by the electric motor 28.

The power on/off switch 32 has a current rating that is approximately equal to the lower current being drawn by the driver circuit 84 and not the higher current being drawn by the electric motor 28. Similarly, the power on/off switch 32 has a voltage rating that is approximately equal to the lower voltage at which the driver circuit 84 operates and not the higher voltage at which the electric motor 28 operates. The power on/off switch 32 is a low current and low voltage switch. Advantageously, the power on/off switch 32 has smaller physical dimensions and generates less heat than a switch that would be required to withstand the higher current and higher voltage at which the electric motor 28 operates.

Figure 2B:
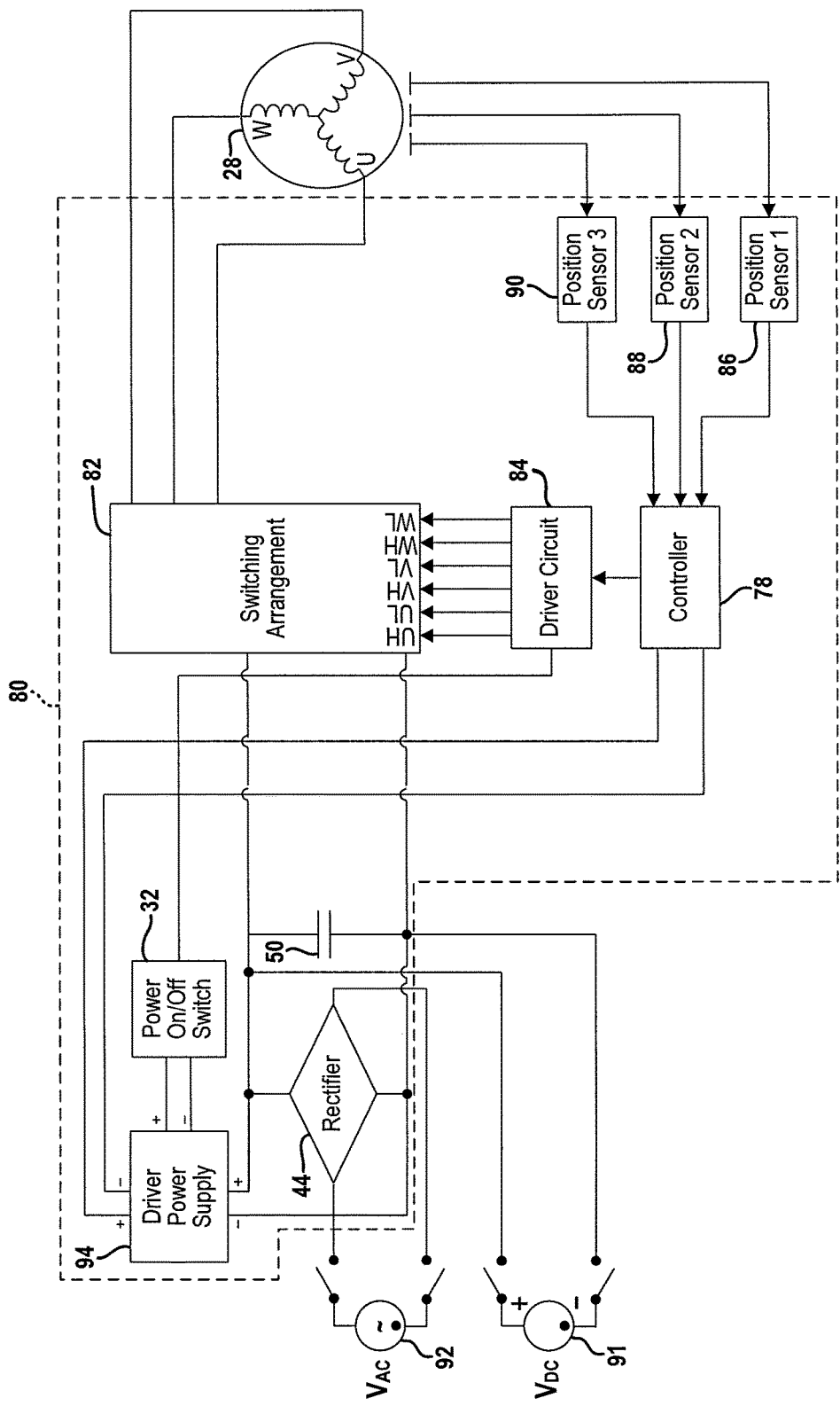
FIG. 2B is a block diagram of an alternative embodiment of a motor control scheme which may be used in the grinder.

FIG. 2B depicts an alternative embodiment of a motor control system 80 that may be employed by the power tool 10. In this embodiment, the output from the DC power supply 91 bypasses the rectifier 44 and is injected directly across the DC bus capacitors 50. By bypassing the voltage drop across the diodes of the rectifier 44, this approach increases the efficiency for a DC power supply. DC polarity is critical in this embodiment as the opposite polarity would damage the switching arrangement. It is also noted that the interlock is positioned before the rectifier 44 but could also be placed after the rectifier 44 as well. Except with respect to the differences discussed herein, this embodiment is substantially the same as the one described above in relation to FIG. 2A.

Figure 2C:
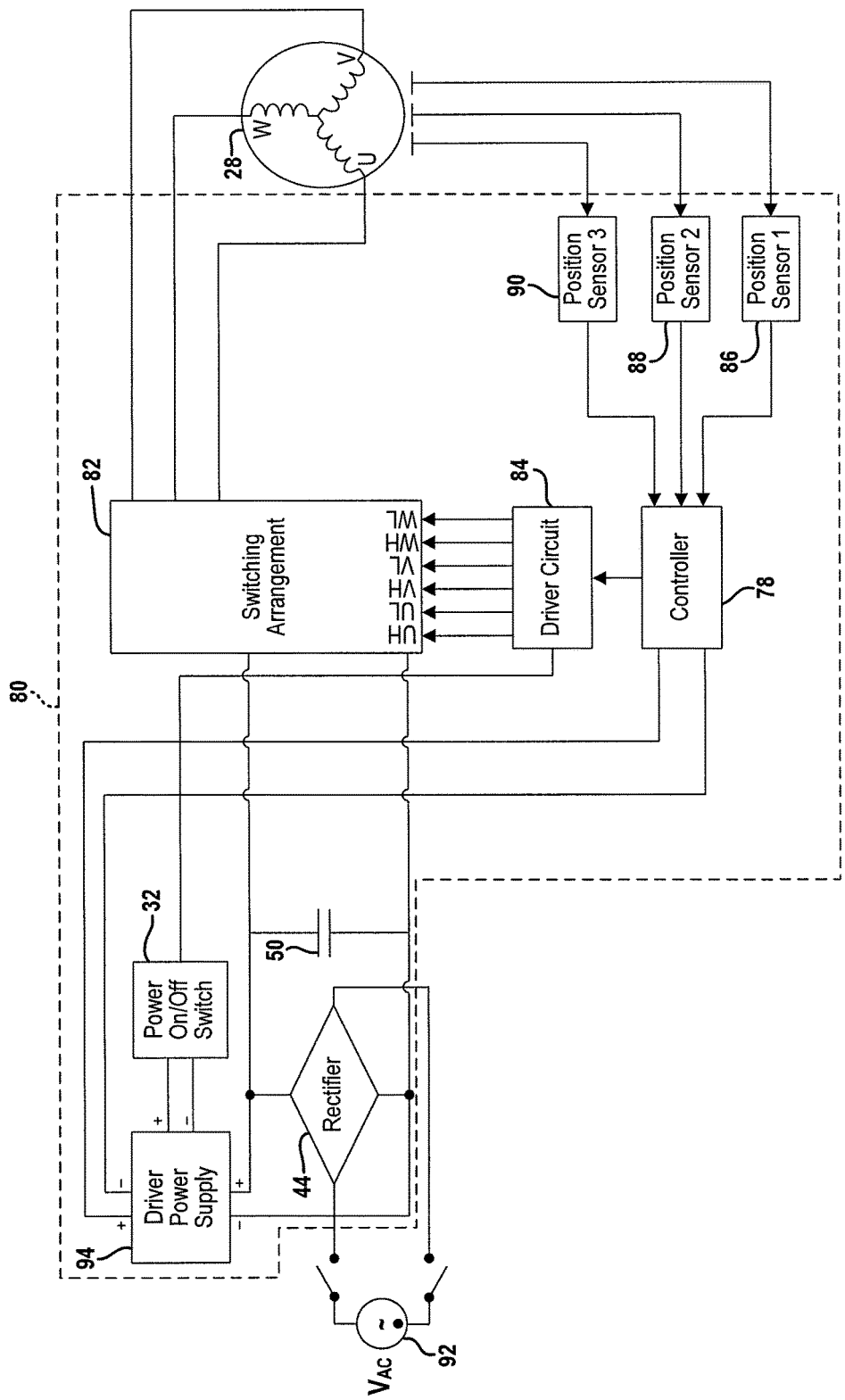
FIG. 2C is a block diagram of another embodiment of a motor control scheme which may be used in a grinder.

In some embodiments, the handheld grinder 10 may be configured to receive power only from an AC power source. That is, the grinder includes a power cord for connecting to an AC outlet but does not include a mounting portion for a battery pack. FIG. 2C depicts a motor control system 80 for such a power tool. In this variant, the rectifier 44 is configured to receive an alternating current directly from an AC power supply without the need for an interlock. Except with respect to the differences discussed herein, this motor control system is substantially the same as the one described above in relation to FIGS. 2A and 2B.

Brushless DC power tools have been adapted to AC applications by simply rectifying the AC power into DC power. This can be accomplished, for example by means of a full-wave bridge rectifier followed by a suitable capacitor, and the use of higher voltage electronic components. Higher power output in brushless AC power tools also requires increases in the steady-state current carrying capacity of the electronics and the ability to remove additional waste heat. With these changes, brushless DC motors can be adapted to AC power sources.

Figure 4A:
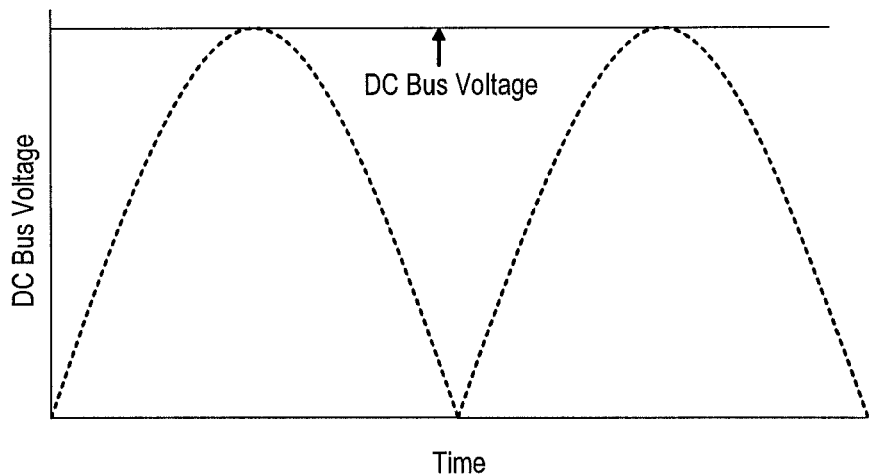
FIG. 4A is a diagram illustrating the DC bus voltage obtained from a fully-rectified AC input voltage with no load.

Because brushless DC power tools are most often operated from a rechargeable battery, their power source is a relatively constant DC voltage, namely the battery voltage. With the advent to brushless AC power tools, the rectifier and capacitor were sized accordingly to produce a relatively constant DC voltage from which the brushless DC motor could operate as shown in FIG. 4A. The full-wave rectified AC waveform as measured across the capacitor 50 is referred to as the "DC bus voltage". It is noted that in this diagram, it is assumed that the tool is operating under a maximum heavy load that the tool is rated to handle.

Constant, or relatively constant, voltage is typically achieved with large values of capacitance following the full-wave bridge rectifier. For discussion purposes, the comparatively small voltage drops across the individual diodes in the full-wave bridge rectifier are ignored. The numerical value of the capacitor will be determined by the current demands of the motor under load, and the allowable voltage ripple on the capacitor. Voltage ripple on the capacitor means there is ripple current in the capacitor, and because all real capacitors have some (but not zero) equivalent series resistance (ESR), this ripple current will cause heating inside the capacitor. Small amounts of heat are acceptable but large quantities of heat generated inside the capacitor are not acceptable and may cause damage.

Figure 4B:
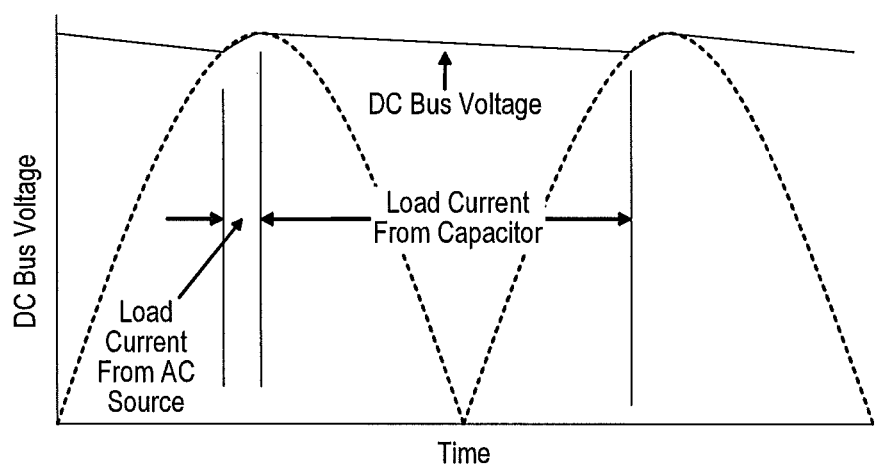
FIG. 4B is a diagram illustrating the DC bus voltage obtained from a fully-rectified AC input voltage at a fixed load.

For a given load, the larger the numerical value of capacitance, the lower the ripple voltage as seen in FIG. 4B. The ripple current is equal to the value of capacitance times the time derivative of the ripple voltage across the capacitor, so long as the equivalent series resistance is very small compared to the reactance. A larger capacitor can store more charge and deliver more current, with less voltage ripple and lower equivalent series resistance, than a smaller capacitor. Thus, large values of capacitance, resulting in DC voltages with very low ripple, were the first choice when making a brushless AC power tool with a brushless DC motor. They most resemble the batteries for which brushless motors were designed.

There are two important consequences of a large capacitor—a smaller power factor for the power tool and less work that can be performed with an AC circuit breaker of fixed root-mean-square (RMS) current limit. Because the capacitor is large in value and the voltage ripple is low, the DC voltage across it is considered "stiff". As the power tool draws current from the DC Bus, it will come from the charge stored on the capacitor, if the instantaneous magnitude of the AC voltage is not sufficient in the moment to supply it. The capacitor's charge will then be replenished from the AC power source through the full-wave bridge rectifier when the magnitude of the AC voltage later rises slightly above the voltage across the capacitor, and the DC Bus voltage will then follow the AC voltage up to its maximum as shown in FIG. 4B. Said differently, when the instantaneous magnitude of the AC voltage is lower than the DC Bus voltage, the capacitor will supply the current required by the motor. The DC Bus voltage will decrease accordingly, so long as the instantaneous magnitude of the AC voltage is lower. At the point where the DC Bus voltage equals the instantaneous magnitude of the AC voltage, the DC Bus voltage will cease decreasing and begin to follow the AC voltage upward. At this point, the current demands of the motor are supplied directly by the AC power source.

Figure 4C:
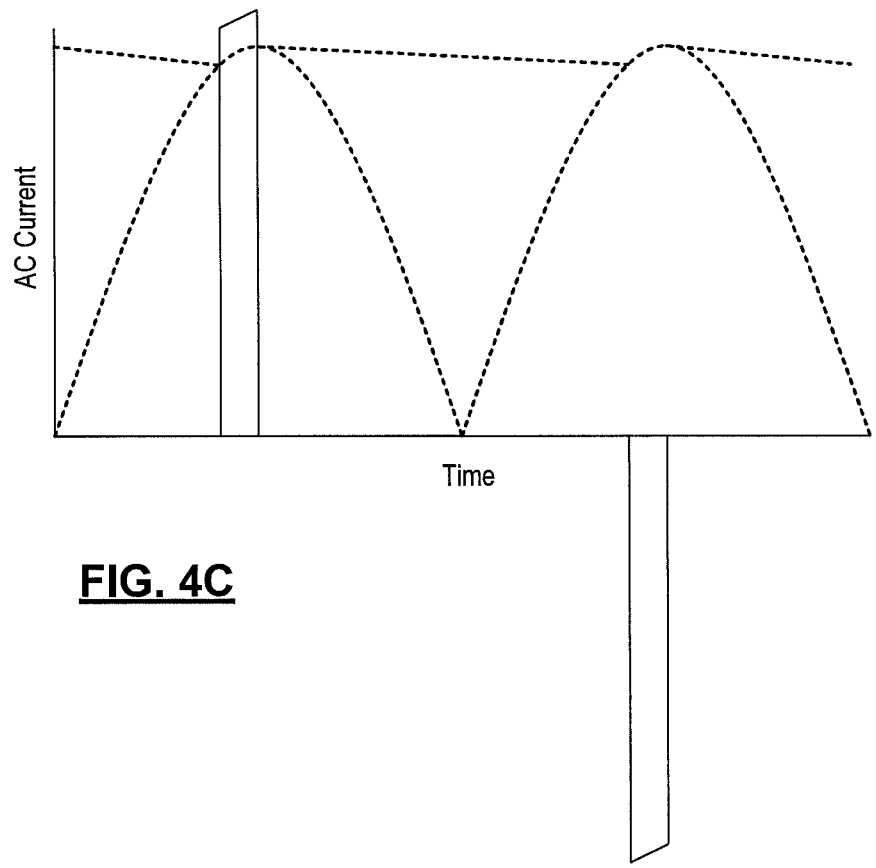
FIG. 4C is a diagram illustrating an idealized AC current drawn from an AC input voltage with a relatively large capacitance.

With large values of capacitance, the motor current is usually supplied by the capacitor. In the short period where the instantaneous magnitude of the AC voltage is higher than the DC Bus voltage, current will rush from the AC source to replenish the charge on the capacitor as well as to power the motor. Thus, large spikes of current are drawn from the AC source near the maxima and minima of the AC voltage as seen in FIG. 4C.

The spiky nature of the AC current is undesirable for two reasons. First, it means that the power factor of the power tool is low and the harmonic content of the AC current is high. The second undesirable result is that for a high value of output power delivered by the power tool the RMS value of the AC input current will be high. The practical result is that an unnecessarily large AC circuit breaker is required with such spiky AC currents for a given amount of work.

Many AC circuits are protected, for example by 15 amp RMS circuit breakers. If the AC current is extremely spiky, as it is with a large value of capacitor, then relatively little work can be performed. If the AC current were lower in value and more spread out in time then much more work could be performed from the same 15 Amp circuit.

One technique for spreading out the AC current drawn from the AC source is to use a relatively small value of capacitance for the DC bus capacitors 50. For example, a high power output tool (e.g., 1.7 kilowatts) with a brushless motor will have its nominal capacitance for the DC bus capacitors 50 in the range of 15-20 µF. For low power output tools, the nominal capacitance for the DC bus capacitors may be set lower. For example, a nominal capacitance of 10 µF may be suitable for a tool having a power output of 0.85 kilowatts. Thus, the capacitance value is dependent upon the output power requirements of the tool. It is envisioned that the nominal capacitance is in the range of 0-200 µF and preferably in the range of 5-20 µF.

Figure 4D:
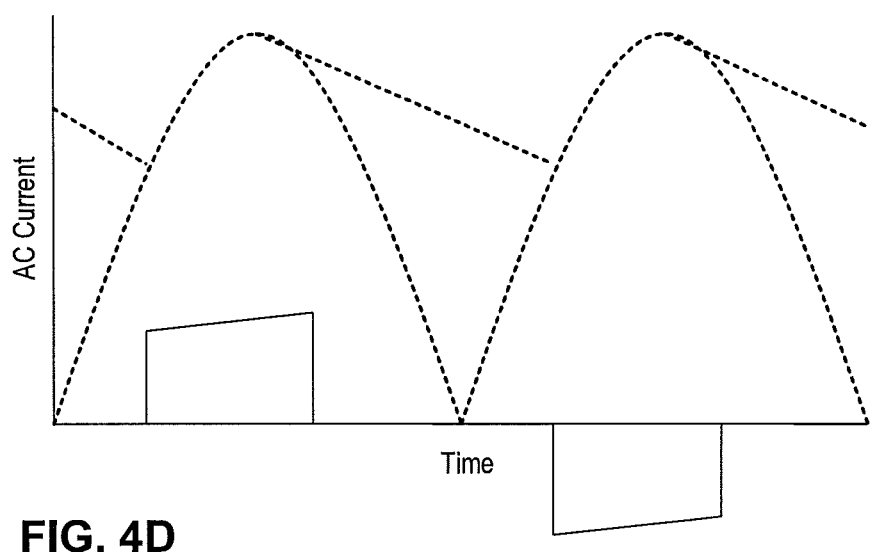
FIG. 4D is a diagram illustrating an idealized AC current drawn from an AC input voltage with a relatively small capacitance.

In an example embodiment, the DC bus capacitors 50 are implemented using film capacitors. Film capacitors can be made from polymer plastics metalized on both sides and may be rolled with additional suitable insulators. The DC bus capacitors 50 may be implemented by a single capacitor or a series of capacitors (e.g., two 4.7 µF capacitors in parallel to achieve a nominal capacitance of 9.4 µF or four 4.7 µF capacitors in parallel to achieve a nominal capacitance of 18.8 µF). In comparison to traditional electrolytic capacitors, film capacitors have smaller physical dimensions and less equivalent series resistance per unit capacitance. By reducing the nominal capacitance of the DC bus capacitors 50, the time which the AC voltage replenishes charge on the capacitor is greatly increased. The result is that the power factor increases, the harmonic content of the AC current goes down, and the amount of work that can be performed through a 15 Amp AC circuit breaker increases as shown in FIG. 4D.

It is envisioned that the power cord of the power tool is connectable to a DC power source, e.g., a DC generator such as a welder having a DC output power line, having a DC output voltage of 120V. With a small capacitor 50 having a capacitance value of approximately 0-50 µF, power tool 10 may provide a higher max power out from a DC power source having a nominal voltage of 120 VDC, than it would from a 120V AC mains power source. Specifically, using a small capacitor of 0-50 microF, the DC bus voltage resulting from a 120V AC mains power source has a nominal value of approximately 108V. An exemplary power tool may provide a maximum cold power output of approximately 1600 W from the 108V DC bus voltage. By comparison, the same power tool provides a maximum cold power output of more than 2200 W from the DC bus when power is being supplied by the 120V DC power source. This improvement represents a ratio of 2200/1600=1.37 (which corresponds to the voltage ratio^3, i.e., $(120/108)^3$).

Figure 5:
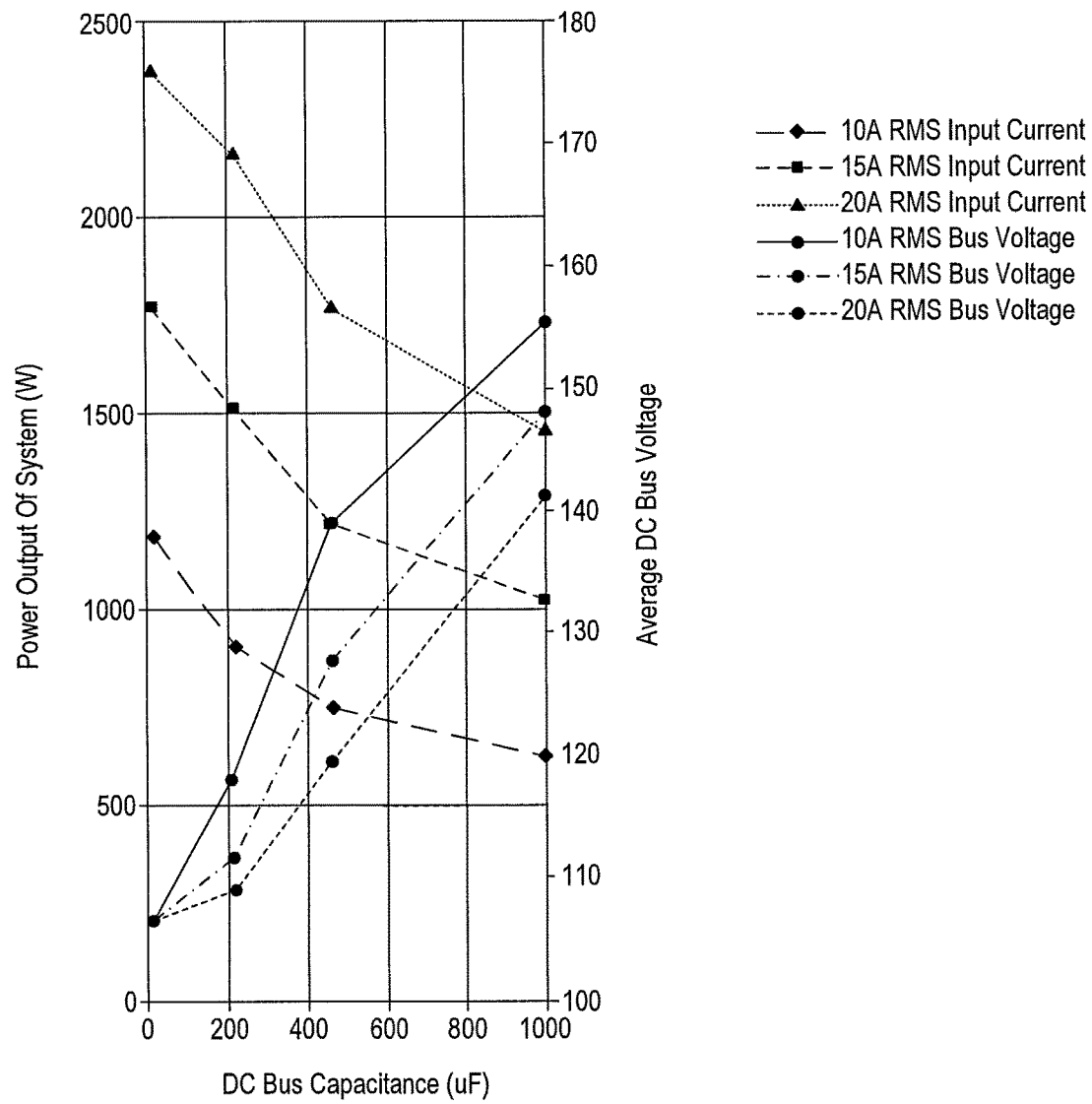
FIG. 5 is a graph illustrating the relationship between power output, average DC bus voltage and bus capacitance in an example power tool.

In another aspect of this disclosure, comparable power outputs from the AC and DC power sources can be achieved by adjusting the capacitance value of the capacitor 50. FIG. 5 depicts power output and average DC bus voltage in relation to capacitance values for capacitor 50. The x axis in this diagram depicts varying capacitance values from 0 to 1000 uF; whereas, the Y axes respectively represent the maximum power watts-out (W) of the power tool ranging from 0-2500 W as well as the average DC bus voltage (V) ranging from 100-180V. The three RMS current values represent the rated RMS current of the AC power supply. For example, in the US, the wall socket may be protected by a 15 A RMS current circuit breaker. In this example, it is assumed that the power tool is operating under heavy load close to its maximum current rating.

As shown in this diagram, for a power tool configured to be powered by a 10 A RMS current power supply (i.e., the tool having a current rating of approximately 10 A RMS current, or a power supply having a current rating of 10 A RMS current), the average DC bus voltage under heavy load is in the range of approximately 108-118V for the capacitor range of 0-200 uF; approximately 118-133V for capacitor range of 200 to 400 uF; approximately 133-144V for capacitor range of 400-600 uF, etc.

Similarly, for a power tool configured to be powered by a 15 A RMS current power supply (i.e., the tool having a current rating of approximately 15 A RMS current, or a power supply having a current rating of 15 A RMS current), the average DC bus voltage under heavy load is in the range of approximately 108-112V for the capacitor range of 0-200 uF; approximately 112-123V for capacitor range of 200 to 400 uF; approximately 123-133V for capacitor range of 400-600 uF, etc.

Similarly, for a power tool configured to be powered by a 20 A RMS current power supply (i.e., the tool having a current rating of approximately 20 A RMS current, or a power supply having a current rating of 20 A RMS current), the average DC bus voltage under heavy load is in the range of approximately 108-110V for the capacitor range of 0-200 uF; approximately 110-117V for capacitor range of 200 to 400 uF; approximately 117-124V for capacitor range of 400-600 uF, etc.

In one embodiment, in order to provide an average DC bus voltage from the AC mains power source (e.g., a 108V nominal RMS voltage) that is comparable to the nominal voltage received from the DC power source (120 VDC), the capacitor value may be sized based on the current rating of the power tool and the target DC bus voltage. For example, a capacitor value of approximately 230 uF may be used for a tool powered by a 10 A RMS current power supply (i.e., the tool having a current rating of approximately 10 A RMS current, or configured to be powered by a power supply having a current rating of 10 A RMS current) to provide an average DC bus voltage of approximately 120V from the AC mains. This allows for the power tool to provide substantially similar output levels for 120V AC power source as it would from a 120V DC power source.

Likewise, a capacitor value of approximately 350 uF may be used for a tool powered by a 15 A RMS current power supply (i.e., the tool having a current rating of approximately 15 A RMS current, or configured to be powered by a power supply having a current rating of 15 A RMS current) to provide an average DC bus voltage of approximately 120V from the AC mains. More generally, capacitor may have a value in the range of 290-410 uF for a tool powered by a 15 A RMS current power supply to provide an average voltage substantially close to 120V on the DC bus from the AC mains. This allows for the power tool to provide substantially similar output levels for 120V AC power source as it would from a 120V DC power source.

Finally, a capacitor value of approximately 500 uF may be used for a tool powered by a 20 A RMS current power supply (i.e., the tool having a current rating of approximately 20 A RMS current, or configured to be powered by a power supply having a current rating of 20 A RMS current) to provide an average DC bus voltage of approximately 120V from the AC mains. More generally, the capacitor may have a value in the range of 430-570 uF for a tool powered by a 20 A RMS current power supply to provide an average voltage substantially close to 120V on the DC bus from the AC mains. This allows for the power tool to provide substantially similar output levels for 120V AC power source as it would from a 120V DC power source.

Figure 6:
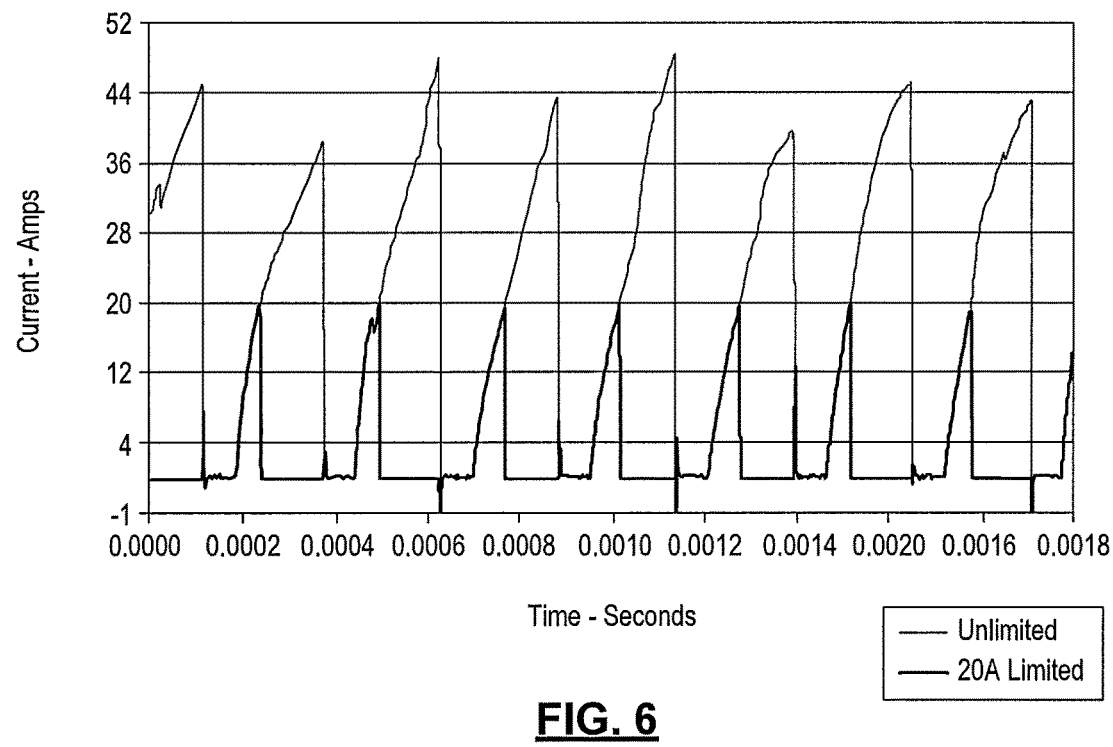
FIG. 6 is a graph illustrating implementation of a 20 amp cycle-by-cycle current limit.

In another aspect of this disclosure, a cycle-by-cycle current limit is also implemented in the power tool 10. When the instantaneous bus current in a given cycle exceeds a prescribed current limit, the select drive signals to the switches in the switching arrangement 82 are turned off from the remainder of the cycle. At the beginning of the next cycle, these drive signals are restored. For each cycle, the instantaneous current continues to be evaluated in a similar manner. This principle is illustrated in FIG. 6, where the thinner line indicates the instantaneous current without a limit and the thicker line indicates the instantaneous current with an enforced 20 Amp limit. Cycle-by-cycle current limit enables the power tool to achieve similar performance across different types of power sources and under varying operating conditions as will be further described below.

Figure 7:
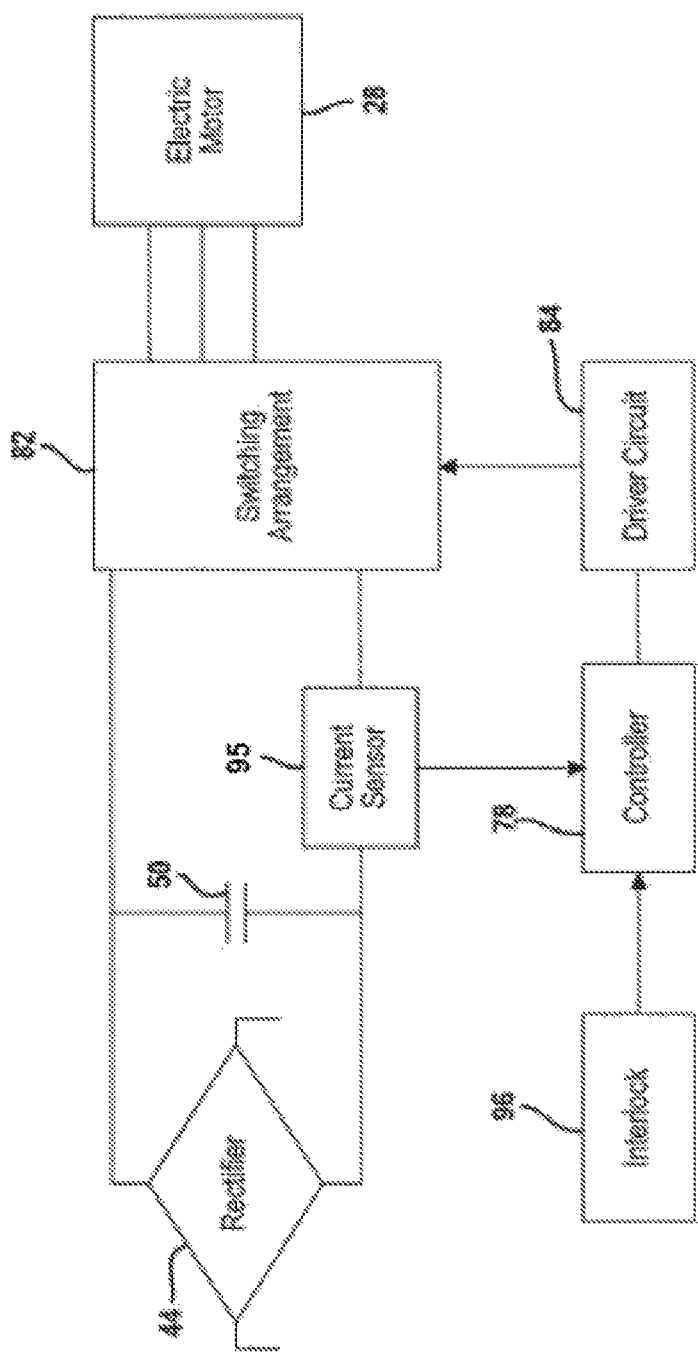
FIG. 7 is a block diagram depicting a portion of the motor control scheme modified to support cycle-by-cycle current limits.

Cycle-by-cycle current limiting can be implemented by modifying the motor control system 80 as shown in FIG. 7. Specifically, a current sensor 95 is configured to sense the current through the DC bus and provide a signal indicative of the sensed current to the controller 78. In an exemplary embodiment, the current sensor 95 is implemented using a shunt resistor disposed in series between the capacitor 50 and the switching arrangement 82. Although not limited thereto, the shunt resistor is preferably positioned on the low voltage side of the DC bus. In another embodiment, a shunt may be placed in each lower leg of the switching arrangement 82. In this case, current for each phase is sensed and reported to the controller 78. It is also envisioned that the shunts may be positioned on the input side of the rectifier as well. In any case, the controller 78 is able to detect the instantaneous current being delivered to the motor.

Figure 8:
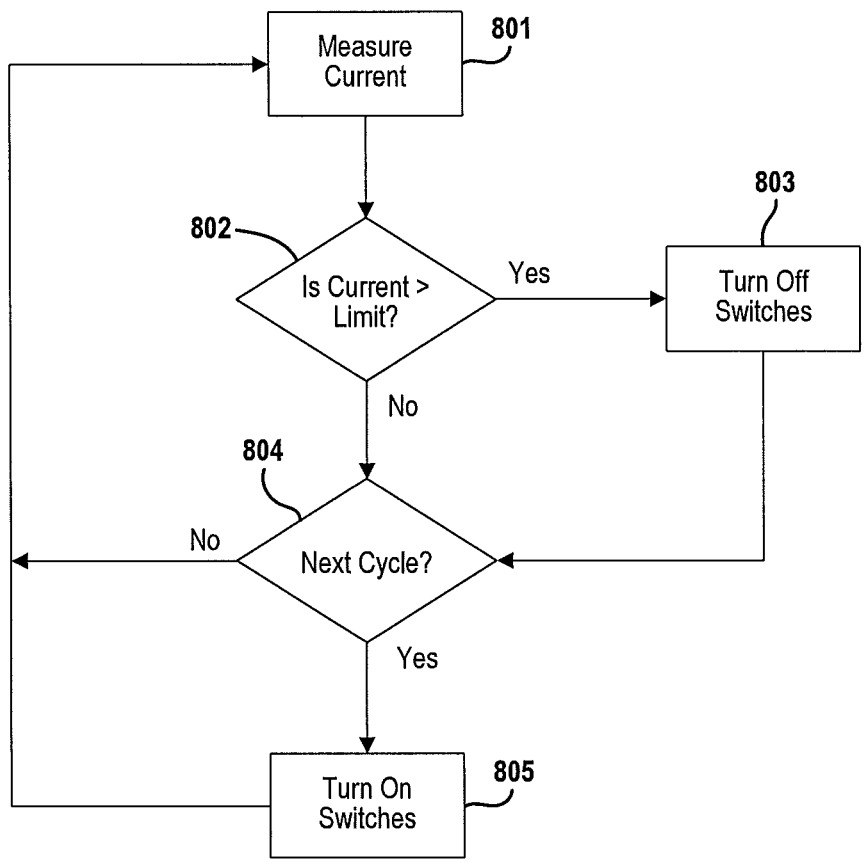
FIG. 8 is a flowchart illustrating an example method for implementing cycle-by-cycle current limits.

The controller 78 is configured to receive a measure of instantaneous current passing from the rectifier to the switching arrangement operates over periodic time intervals (i.e., cycle-by-cycle) to enforce a current limit. With reference to FIG. 8, the controller enforces the current limit by measuring current periodically (e.g., every 5 microseconds) at 801 and comparing instantaneous current measures to the current limit at 802. If the instantaneous current measure exceeds the current limit, the controller 78 cooperatively operates with the driver circuit 84 to turn off the motor switches for remainder of present time interval at 803 and thereby interrupt current flowing to the electric motor. If the instantaneous current measure is less than or equal to the current limit, the controller 78 continues to compare the instantaneous current measures to the current limit periodically for the remainder of the present time interval as indicated at 804. Such comparisons preferably occur numerous times during each time interval (i.e. cycle). When the end of the present time interval is reached, the controller 78 cooperatively operates with the driver circuit 84 to turn on the motor switches at 805 and thereby resume current flow to the motor for the next cycle. In one embodiment, the duration of each time interval is fixed as a function of the given frequency at which the electric motor is controlled by the controller. For example, the duration of each time interval is set at approximately ten times an inverse of the frequency at which the electric motor is controlled by the controller. In the case the motor is controlled at a frequency of 10 kilo-Hertz, the time interval is set at 100 microseconds. In other embodiments, the duration of each time interval may have a fixed value and no correlation with the frequency at which the electric motor is controlled by the controller.

In the example embodiment, the electric motor is controlled by pulse width modulated (PWM) signals received from the motor drive circuit and duration of the each time interval equals period of the PWM signals. In a fixed speed tool under a no load condition, the duty cycle of the PWM control signals is set, for example at 60%. Under load, the controller 78 operates to maintain a fixed speed by increasing the duty cycle. If the current through the DC voltage bus increase above the current limit, the controller 78 interrupts current flow as described above which in effect reduces the duty cycle of the PWM signals. For a variable speed tool under a no load condition, the duty cycle of the PWM control signals ranges for example from 15% to 60%, in accordance with user controlled input, such as a speed dial or a trigger switch. The controller 78 can increase or decrease the duty cycle of the PWM signals during a load condition or an over current limit condition in the same manner as described above. In one embodiment, speed control and current limiting may be implemented independently from each other by using three upper motor switches for speed control and the three lower switches for current limiting. It is envisioned that the two functions may be swapped between the upper and lower switches or combined together into one set of switches.

In the examples set forth above, the time interval remained fixed. When this period (time interval) remains fixed, then the electronic noise generated by this switching will have a well-defined fundamental frequency as well as harmonics thereof. For certain frequencies, the peak value of noise may be undesirable. By modulating the period over time, the noise is distributed more evenly across the frequency spectrum, thereby diminishing the noise amplitude at any one frequency. In some embodiment, it is envisioned that the time interval may be modulated (i.e., varied) over time to help distribute any noise over a broader frequency range.

In a variant, the controller 78 enforces the cycle-by-cycle current limit by setting or adjusting the duty cycle of the PWM drive signals output from the gate driver circuit 84 to the power switch circuit 82. In an embodiment, the duty cycle of the PWM drive signals may be adjusted in this manner following the instant current cycle (i.e., at the beginning of the next cycle). In a fixed speed tool, the controller 78 will initially set the duty cycle of the drive signals to a fixed value (e.g., duty cycle of 75%). The duty cycle of the drive signals will remain fixed so long as the current through the DC bus remains below the cycle-by-cycle current limit. The controller 78 will independently monitor the current through the DC bus and adjust the duty cycle of the motor drive signals if the current through the DC bus exceeds the cycle-by-cycle current limit. For example, the controller 78 may lower the duty cycle to 27% to enforce the 20 amp current limit. In one embodiment, the duty cycle value may be correlated to a particular current limit by way of a look-up table although other methods for deriving the duty cycle value are contemplated by this disclosure. For variable speed tool, the controller 78 controls the duty cycle of the motor drive signals in a conventional manner in accordance with the variable-speed signal from the variable-speed actuator. The cycle-by-cycle current limit is enforced independently by the controller 78. That is, the controller will independently monitor the current through the DC bus and adjust the duty cycle of the drive signals only if the current through the DC bus exceeds the cycle-by-cycle current limit as described above.

In some embodiments, the cycle-by-cycle current limit may be dependent upon the type and/or nominal voltage of the power supply. For a tool configured to receive power from either a DC or AC power supply, the controller 78 may receive a signal from the interlock mechanism 96, where the signal indicates whether the tool is coupled to a DC supply (e.g., 120V) from a battery pack or an AC supply (e.g. 120V) from an AC socket. In lieu of or in addition to the DC supply, the tool may be further configured to receive power from an AC source having different nominal voltages (e.g., 120 v or 230V). Likewise, the tool may be configured to receive power from battery packs having different nominal voltages (e.g., 60V or 120V). In these cases, the controller 78 also receives a signal indicative of the amplitude of the input power signal. In other embodiments, the controller may be configured to sense directly the nominal voltage being supplied by the power supply. Other methods for determining the type and/or nominal voltage of the power supply are also contemplated by this disclosure.

Given the type and/or nominal voltage of the power supply, the controller 78 selects a current limit to enforce during operation of the power tool. In one embodiment, the current limit is retrieved by the controller 78 from a look-up table. An example look-up table is as follows:

| Source type | Nominal voltage | Current limit |
| --- | --- | --- |
| AC | 120 V | 40 A |
| AC | 230 V | 20 A |
| DC | 120 V | 35 A |
| DC | 108 V | 40 A |
| DC | 60 V | 70 A |
| DC | 54 V | 80 A |

That is, the controller 78 will enforce a 40 Amp current limit when the tool is coupled to a 120V AC power supply but will enforce a 20 Amp current limit when the tool is coupled to a 230V AC power supply. As a result, the effective output power of the tool is substantially the same. Because the average voltage supplied from by a 120V AC source is approximately 108 volts DC, the controller 78 will also enforce a slightly lower current limit (e.g., 35 amps) when the tool is coupled to a 120V DC power supply. This lower current limit results in output power so that it is substantially the same as when the tool is coupled to 120V AC power supply. Similarly, the controller 78 will enforce a higher current limit (e.g., 70 amps) when the tool is coupled to a 60V DC power supply. In this example, output power of the tool has been normalized to the case of a 120V AC power supply. Tool performance could also be normalized in relation to one of the other types of power supplies. Moreover, it is understood that the current limits set forth above are approximate values and more precise values may be used in practice to achieve similar performance from the tool across different power supplies.

During motor rotation, the electronic switches in the switching arrangement 82 transition back and forth between current conduction and no current conduction. In their conducting state they are not lossless, but generate some heat which, if not removed, will raise the temperature of the switch to the point of failure. Limiting the amount of current through the switch will limit the amount of heat generated within it. Often, extreme temperature is the reason for failure in electronic switches. Maintaining a reasonable temperature allows the electronic switch to continue to operate. Conventionally, this is accomplished by cooling the switches with airflow and a heat sink, and also by limiting the current through the switches. Because electronic switches in an electronically commutated three-phase motor typically conduct current approximately one-third of the time, it becomes possible to raise the level of current during the one-third of the time the switches are conducting because there is no conduction in the other two-thirds of the time.

When the electronically commutated motor is first started, it begins rotating from a stationary position and the appropriate upper and lower electronic switches in the switching arrangement are conducting continuously. Only after the motor achieves some significant rotational speed does each electronic switch experience the one-third duty cycle sufficient to average out the heat generation across the cycle.

Figure 9:
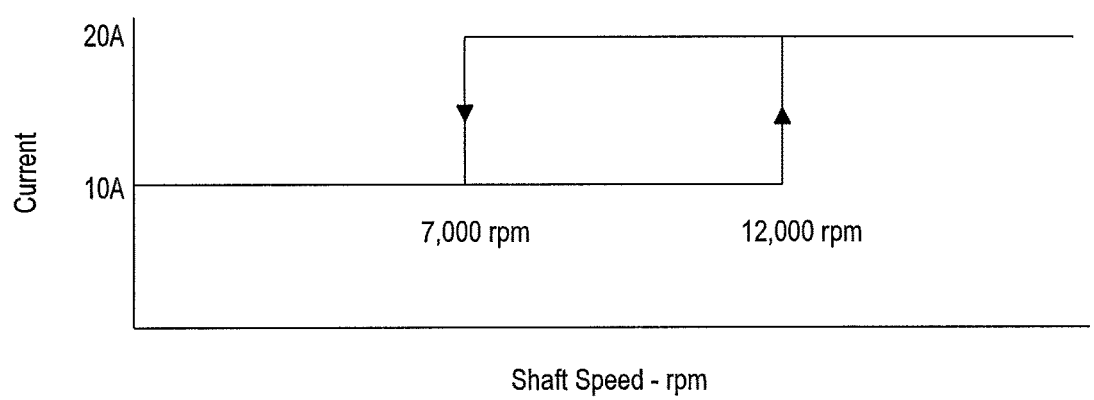
FIG. 9 is a graph depicting how the cycle-by-cycle current limit can be adjusted during tool start-up conditions.

To prevent the electronic switches from overheating during start-up, cycle-by-cycle current limiting may be used to limit current at start-up. Rather than implementing a single current limit, the tool 10 is configured to apply a lower current during start-up as shown in FIG. 9. In this example, a current limit of 10 amps is enforced by the controller 78 when the shaft speed is less than a predefined threshold (e.g., 12,000 rpm). After a sufficient shaft speed has been achieved, the cycle-by-cycle current limit is raised to a high limit of 20 amps. Should the shaft speed decrease, the current limit may revert back to the lower limit of 10 Amps. This feature may be implemented with hysteresis so that the current limit does not revert back to the lower value until the shaft speed is less than a second predefined threshold which has a value lower than the first threshold (e.g. 7,000 rpm). Current limits and speed threshold values are merely illustrative and may vary depending on switch conduction time and other factors. It is envisioned that the shaft speed may be determined by the controller 78, for example from input from position sensors.

In another aspect of this disclosure, cycle-by-cycle current limiting can be used to detect a pinch event or stall condition and possibly protect a user from losing control of the tool. A pinch event or stall condition is understood to mean an event that very quickly decelerates the rotation of the tool and causes an immediate rise in current. In the case of a grinder, a pinch event may occur when using the grinder as a cut-off tool and the workpiece moves in such a way as to pinch the cut-off accessory. Causes for a pinch event vary with the type of tool and the type of accessory.

Figure 10:
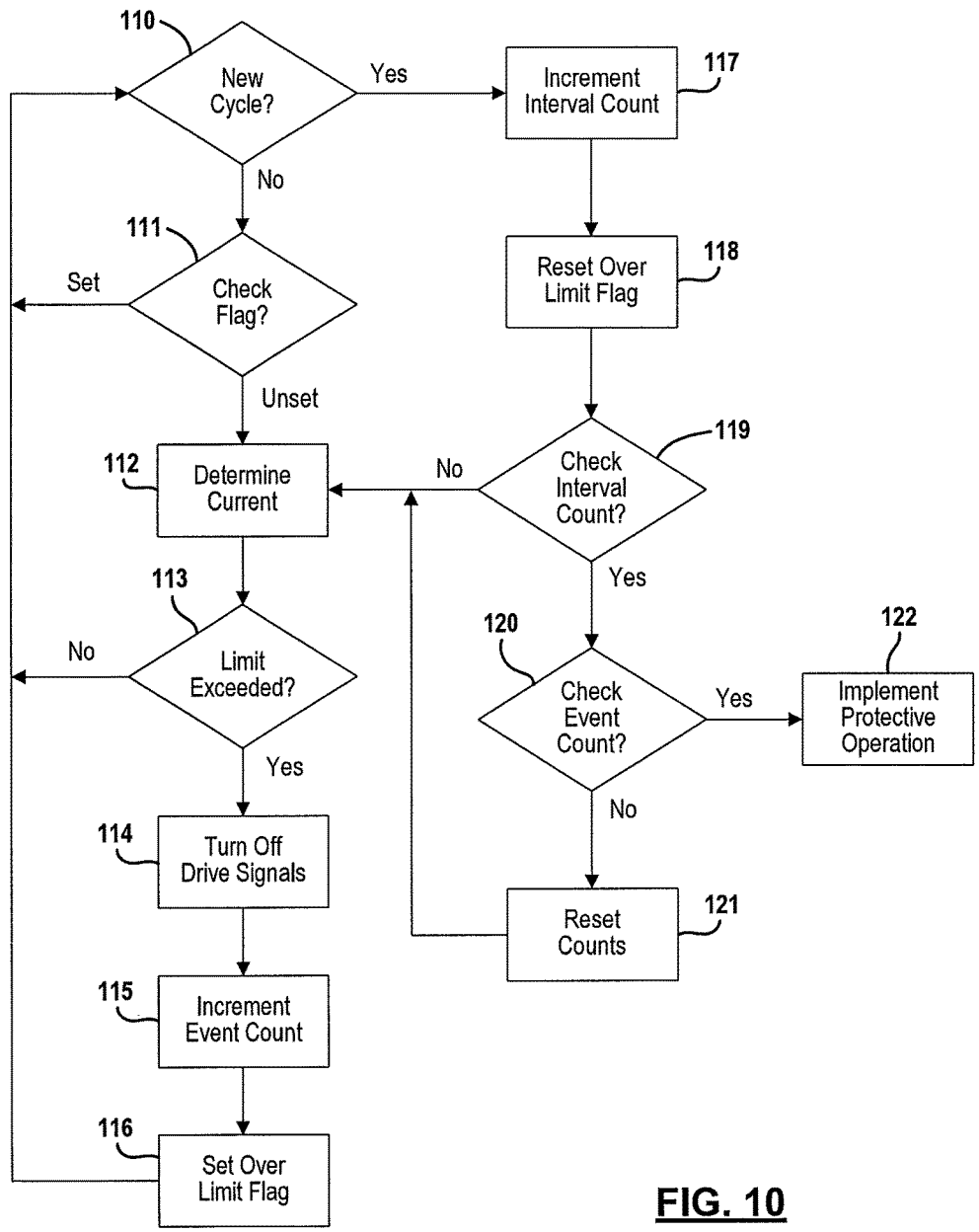
FIG. 10 is a flowchart illustrating an example method for detecting a stall condition using cycle-by-cycle current limit.

An example method for detecting a pinch event using cycle-by-cycle current limit is further described in relation to FIG. 10. For each cycle, the instantaneous bus current is measured periodically (e.g., every 1 microsecond) during the cycle as indicated at 112. The measured current is compared at 113 to the current limit presently being enforced by the controller. When the current limit is exceeded, select drive signals to the switches in the switching arrangement 82 are turned off for the remainder of the cycle as indicated at 114. Additionally, an event counter is incremented by one at 115 and an over limit flag is set true at 116.

Before checking the current limit, the over limit flag is checked at step 111. Measurement of the current and its comparison to the current limit will continue for the entire cycle so long as the over limit flag is set false. Conversely, these steps are skipped for the reminder of the cycle once the over the limit flag is set to true. In this way, the event counter is incremented (if applicable) only once per cycle. Thus, the check of the current limit will be repeated until either the current limit is exceeded or a new cycle begins.

At the beginning of the next cycle, the drive signals to the switches are restored by the controller. Additionally, a cycle counter is incremented by one at 117 and the over limit flag is reset to false at 118. Moreover, a determination is made as to whether a pinch event has occurred once a sufficient sample size has accrued. For example, a determination about a pinch event can be made every 10 milliseconds. Assuming a cycle of 100 microseconds, the determination about a pinch event would be made when the cycle counter reaches a count of 100. To do so, the cycle counter is compared at 119 to a predefined cycle threshold whose value correlates to the determination period (e.g., 100 in the example above).

When the cycle count reaches the threshold value, the event counter is then compared at 120 to an event threshold. In one embodiment, a pinch event is deemed to have occurred when the event count exceeds the event threshold (e.g., 20). In this case, the controller initiates a protective operation at 122 to protect to the tool operator. For example, the controller may cut power to the motor and/or apply a brake to the output shaft of the tool coupled thereto. Suspending drive signals effectively makes the motor coast. In a pinch event, momentum is transferred to the tool and thus the user. With braking, this momentum is reduced to lower levels than experienced during coasting, which helps to protect the user. Other types of protective operations are also contemplated by this disclosure.

In other embodiments, when the event count reaches the event threshold, the present 10 millisecond time interval is counted as an over-current interval, and a pinch event is deemed to have occurred, when a fixed number (e.g., 10) of over-current intervals occur consecutively. When the event count does not exceed the event threshold, the event counter and the cycle counter are reset at 121 and processing of the remainder of the cycle continues as indicated at 112. Likewise, when the cycle count does not exceed the cycle threshold, processing of the remainder of the cycle continues. Values set forth above have been found to be reasonable for a wide variety of conditions but are not considered limiting. Different values can be used to accommodate specific type of pinch conditions in different types of tools. It is to be understood that only the relevant steps of the methodology are discussed in relation to FIG. 10, but that other software-implemented instructions may be needed to control and manage the overall operation of the system.

Figure 11:
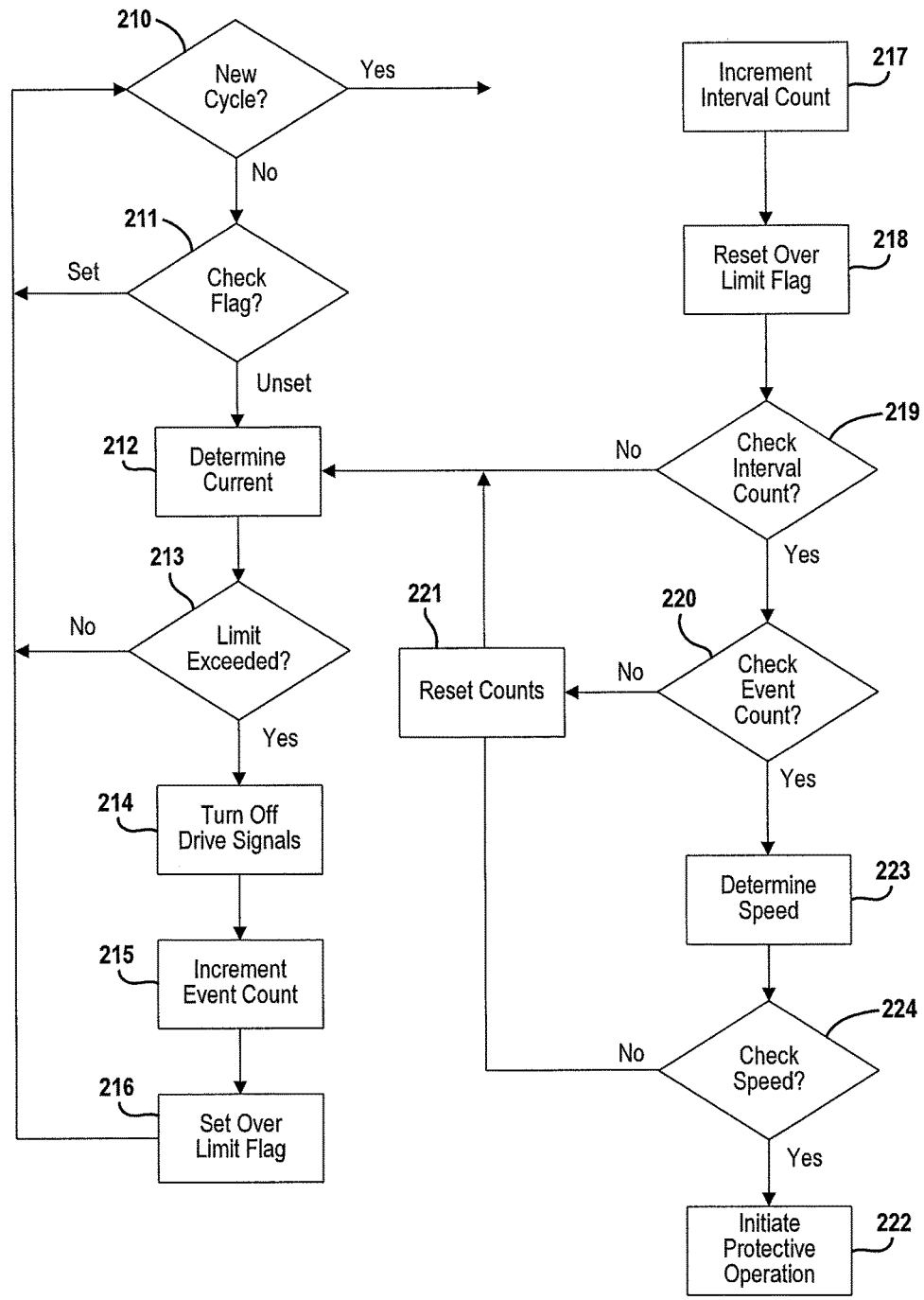
FIG. 11 is a flowchart illustrating an example method for detecting a stall condition using cycle-by-cycle current limit.

The method set forth above may also be used to detect stall conditions as well as other tool conditions which may develop at a slower rate than a pinch event. For example, when a tool operates under heavy loads, the current levels are high and the motor speed is low such that airflow is low and the tool is at risk of overheating. With reference to FIG. 11, the methodology is substantially similar to that described above in relation to FIG. 10. A secondary tool parameter is used to detect a stall condition. In addition to checking the event count, the rotational speed of the shaft is determined at 223 and compared to a speed threshold at 224. A stall condition is deemed to have occurred when the event count exceeds the event threshold and the rotational speed of the shaft is less than a speed threshold (e.g., 4,000 rpm). In this scenario, the controller initiates a protective operation at 222 to prevent damage to the tool. The remaining steps and variants thereof are described above in relation to FIG. 10 and omitted here for brevity. While reference is made to rotational shaft speed as the secondary tool parameter, other tool parameters may also be used in conjunction with over current events to detect stall conditions. One of those other tool parameters may be time since the last signal from any position indicator. If that time, as expressed as a count of a timer, exceeds some limit, and the over current event counter also exceeds its limit, then motor operation is suspended as described above.

There are also other techniques for testing the instantaneous current and the methods described above are not meant to limit the scope of this disclosure. In the examples above the current is measured at discrete intervals. But analog comparators can also be used to signal an instantaneous over current limit and these signals can then be used in similar fashion to effect the same result as described above. It is again to be understood that only the relevant steps of the methodology are discussed in relation to FIG. 11, but that other software-implemented instructions may be needed to control and manage the overall operation of the system.

Adjustments to the cycle-by-cycle current limit may also be used to prevent overheating conditions from occurring in the tool. Variable speed grinders present a special challenge—preventing burn up under heavy loads at low speeds. Variable speed of a variable speed grinder may be set, for example by a rotary thumbwheel. Ranging from high speed selection to low speed selections, the thumbwheel position selects the nominal, unloaded speed of the grinder. The thumbwheel is commonly referred to as a speed dial, and the position of the speed dial is the speed setting for the tool.

Certain applications for grinders are best performed at low speed dial settings. In these applications, as the user may apply more and more force, thereby placing the grinder under increasingly heavier loads. At some point, which may occur relatively quickly at lower speed dial settings in comparison with higher speed dial settings, the motor will begin to slow down as it is simply not capable of delivering that level of power at the requested speed dial setting. As the motor speed decreases, the cooling fan attached to the motor shaft also slows down. The airflow generated by the fan drops faster than the speed. As a result, the cooling of the motor, the gear case, and the electronics, becomes less and less effective. Eventually temperatures may build up to the point of failure.

Figure 12:
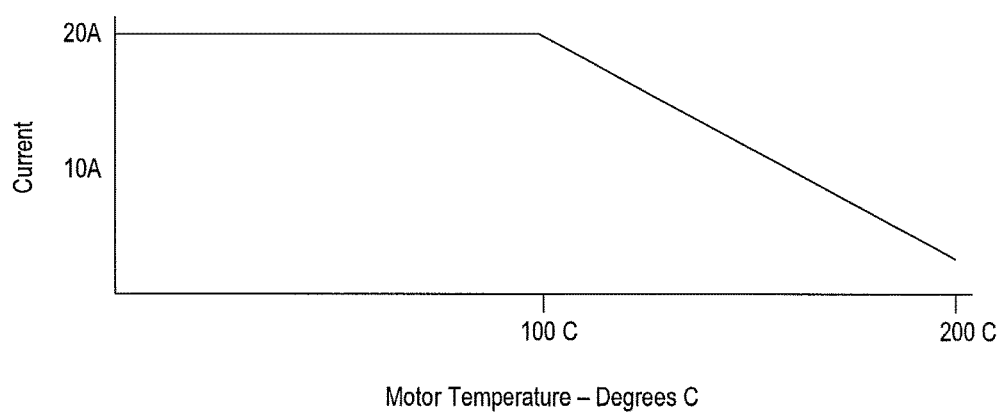
FIG. 12 is a graph depicting how the cycle-by-cycle current limit can be adjusted in accordance with motor temperature.

One technique for preventing such overheating conditions is through the use of a temperature sensor disposed inside the housing of the tool. Although not limited hereto, the temperature sensor may be placed in or on a temperature sensitive component of the motor (e.g., a coil winding). In one embodiment, the controller sets and enforces the cycle-by-cycle current limit in the manner set forth above. The controller may also be configured to receive a signal indicative of temperature from the temperature sensor. During operation, the controller monitors the temperature and further operates to adjust the cycle-by-cycle current limit in accordance with the measured temperature as shown for example in FIG. 12. In this example, the controller enforces a 20 Amp current limit so long as the temperature remains below 100 Celsius. Once the motor temperature exceeds 100 Celsius, the controller lowers the cycle-by-cycle current limit and thereby lowers the power that can be delivered by the tool. In practice, the user will experience the reduction in tool performance and back off the force being applied to the tool which in turn allows the motor speed to increase. As motor speed increase, airflow increases and thereby lowers the motor temperature. Conversely, as motor temperature decreases, the controller increases the cycle-by-cycle current limit until it returns to the initial 20 Amp limit. Adjustments to the current limit may be correlated with temperature linearly as shown or in some other manner such as exponentially. In this way the power tool user learns the maximum operating point of the grinder at any particular speed dial setting and can avoid overheating the tool.

Some of the techniques described herein may be implemented by one or more computer programs executed by one or more processors residing, for example on a power tool. The computer programs include processor-executable instructions that are stored on a non-transitory tangible computer readable medium. The computer programs may also include stored data. Non-limiting examples of the non-transitory tangible computer readable medium are non-volatile memory, magnetic storage, and optical storage.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

What is claimed is:

1. A power tool, comprising:
a housing;
a brushless electric motor drivably connected to an output shaft to impart rotary motion thereto;
a switching arrangement having a plurality of motor switches and interposed between the electric motor and a power supply; and
a controller configured to control a switching operation of the plurality of motor switches for driving the electric motor, the controller configured to detect a measure of current passing from the power supply to the switching arrangement, compare the measure of current to a current limit, and take corrective action to reduce current delivered to the electric motor if the measure of current reaches or exceeds the current limit, wherein the controller operates over periodic time intervals to enforce the current limit on the current delivered to the electric motor, wherein the controller is configured to enforce the current limit by receiving a measure of instantaneous current passing to the switching arrangement within a present time interval of the periodic time intervals, comparing the measure of instantaneous current to the current limit, and, in response to the measure of instantaneous current exceeding the current limit, turning off the motor switches for a remainder of the present time interval and thereby interrupting current flowing to the electric motor,
wherein the controller is further configured to determine a type of the power supply, and set the current limit to a first current limit value if the power supply is an Alternating-Current (AC) power supply and to a second current limit value different from the first value if the power supply is a Direct-Current (DC) power supply so as to obtain an output power of the power tool that is substantially the same for the AC power supply and the DC power supply, wherein the AC power supply provides a different average voltage than the DC power supply.

2. The power tool of claim 1, further comprising an interlock mechanism configured to electrically couple the power tool to one of the AC power supply or the DC power supply, the controller receiving a signal from the interlock mechanism indicative of the type of power supply.

3. The power tool of claim 1, wherein the AC power supply has the same nominal voltage as the DC power supply, the first current limit value is greater than the second current limit value by an amount corresponding to a different between the nominal voltages of the AC and DC power supplies.

4. The power tool of claim 1, wherein the AC power supply has a greater nominal voltage than the DC power supply, and the first current limit value is smaller than the second current limit value by an amount corresponding to a different between the nominal voltages of the AC and DC power supplies.

5. The power tool of claim 1, wherein the controller is configured to control a duty cycle of a pulse-width modulated drive signal associated with the plurality of motor switches for driving the motor, the controller adjusting the duty cycle to limit current to the motor if the measure of current reaches the current limit so as to maintain the supply of current at the current limit.

6. The power tool of claim 1, wherein a duration of each time interval of the period time intervals is fixed as a function of the given frequency at which the plurality of motor switches is controlled by the controller.

7. The power tool of claim 1, wherein the controller is configured to turn on select motor switches at the end of the present time interval and thereby resume current flow to the electric motor.

8. The power tool of claim 1, wherein the duration of each time interval is approximately ten times an inverse of the given frequency at which the plurality of motor switches is controlled by the controller.

9. The power tool of claim 1, wherein the electric motor is controlled by pulse width modulated (PWM) signals and the duration of the each time interval corresponds to a period associated with the PWM signals.

10. The power tool of claim 1, wherein the brushless electric motor is further defined as a three-phase DC motor and the switching arrangement is comprised of six motor switches, each phase of the DC motor is coupled to a high-side switch and a low-side switch.

11. The power tool of claim 10, wherein the controller enforces the current limit using the three low-side switches.

12. A power tool, comprising:
a housing;
a brushless electric motor drivably connected to an output shaft to impart rotary motion thereto;
a power supply interface configured to selectively receive a first power supply having a first nominal voltage or a second power supply having a second nominal voltage, wherein the first nominal voltage is greater than the second nominal voltage;
a switching arrangement having a plurality of motor switches and interposed between the electric motor and the power supply interface; and
a controller configured to control a switching operation of the plurality of motor switches for driving the electric motor, the controller configured to detect a measure of current passing from the power supply to the switching arrangement, compare the measure of current to a current limit, and take corrective action to reduce current delivered to the electric motor if the measure of current reaches or exceeds the current limit,
wherein the controller is further configured to receive a signal indicative of the first nominal voltage when the first power supply is coupled to the power supply interface and indicative of the second nominal voltage when the second power supply is coupled to the power supply interface, the controller is setting the current limit to a first current limit value when the signal is indicative of the first nominal voltage and to a second current limit value when the signal is indicative of the second nominal voltage, wherein the first current limit value is smaller than the second current limit value by an amount corresponding to a different between the first nominal voltage and the second nominal voltage so as to obtain an output power of the power tool that is substantially the same for the first power supply and the second power supply, wherein the first nominal voltage is approximately twice the second nominal voltage and the first current limit value is approximately half the second current limit value.

13. The power tool of claim 12, further comprising an interlock mechanism configured to electrically couple the power tool to one of an Alternative Current (AC) power supply or a Direct Current (DC) power supply, the controller receiving the signal from the interlock mechanism.

14. The power tool of claim 12, wherein the brushless electric motor is further defined as a three-phase DC motor and the switching arrangement is comprised of six motor switches, each phase of the DC motor is coupled to a high-side switch and a low-side switch.

15. The power tool of claim 12, wherein the controller is configured to control a duty cycle of a pulse-width modulated drive signal associated with the plurality of motor switches for driving the motor, the controller adjusting the duty cycle to limit current to the motor if the measure of current reaches the current limit so as to maintain the supply of current at the current limit.

16. A power tool, comprising:
   a housing;
   a brushless electric motor drivably connected to an output shaft to impart rotary motion thereto;
   a power supply interface configured to selectively receive a first power supply having a first nominal voltage or a second power supply having a second nominal voltage, wherein the first nominal voltage is greater than the second nominal voltage;
   a switching arrangement having a plurality of motor switches and interposed between the electric motor and the power supply interface; and
   a controller configured to control a switching operation of the plurality of motor switches for driving the electric motor, the controller configured to detect a measure of current passing from the power supply to the switching arrangement, compare the measure of current to a current limit, and take corrective action to reduce current delivered to the electric motor if the measure of current reaches or exceeds the current limit,
   wherein the controller is further configured to receive a signal indicative of the first nominal voltage when the first power supply is coupled to the power supply interface and indicative of the second nominal voltage when the second power supply is coupled to the power supply interface, the controller is setting the current limit to a first current limit value when the signal is indicative of the first nominal voltage and to a second current limit value when the signal is indicative of the second nominal voltage, wherein the first current limit value is smaller than the second current limit value by an amount corresponding to a different between the first nominal voltage and the second nominal voltage so as to obtain an output power of the power tool that is substantially the same for the first power supply and the second power supply,
   wherein the controller operates over periodic time intervals to enforce the current limit on the current delivered to the electric motor, wherein the controller is configured to enforce the current limit by receiving a measure of instantaneous current passing to the switching arrangement within a present time interval of the periodic time intervals, comparing the measure of instantaneous current to the current limit, and, in response to the measure of instantaneous current exceeding the current limit, turning off the motor switches for a remainder of the present time interval and thereby interrupting current flowing to the electric motor.

17. The power tool of claim 16, wherein a duration of each time interval of the period time intervals is fixed as a function of the given frequency at which the plurality of motor switches is controlled by the controller.

18. The power tool of claim 16, wherein the controller is configured to turn on select motor switches at the end of the present time interval and thereby resume current flow to the electric motor.

* * * * *